US012699483B2

(12) United States Patent
Jung et al.

(10) Patent No.: US 12,699,483 B2
(45) Date of Patent: Aug. 4, 2026

(54) DISPLAY DEVICE AND ELECTRONIC DEVICE INCLUDING THE SAME

(71) Applicant: Samsung Display Co., Ltd., Yongin-si (KR)

(72) Inventors: Min Sun Jung, Yongin-si (KR); Hee Won Ko, Yongin-si (KR); Hwan Woo Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/187,651

(22) Filed: Apr. 23, 2025

(65) Prior Publication Data

US 2026/0050342 A1 Feb. 19, 2026

(30) Foreign Application Priority Data

Aug. 13, 2024 (KR) ........................ 10-2024-0108051

(51) Int. Cl.
| | |
|---|---|
| *G06F 3/00* | (2006.01) |
| *G06F 3/041* | (2006.01) |
| *G06F 3/044* | (2006.01) |
| *G09G 3/32* | (2016.01) |
| *G09G 3/3266* | (2016.01) |

(52) U.S. Cl.
CPC ............ *G06F 3/0418* (2013.01); *G06F 3/044* (2013.01); *G09G 3/3266* (2013.01); *G06F*

*2203/04107* (2013.01); *G09G 2300/0804* (2013.01); *G09G 2354/00* (2013.01)

(58) Field of Classification Search
CPC ......... G06F 2203/04107; G06F 3/0418; G06F 3/044; G09G 2300/0804; G09G 2354/00; G09G 3/3266
See application file for complete search history.

(56) References Cited

U.S. PATENT DOCUMENTS

| | | | |
|---|---|---|---|
| 10,877,617 B2 | 12/2020 | Park et al. | |
| 2019/0179467 A1 | 6/2019 | Kim et al. | |
| 2020/0257386 A1* | 8/2020 | Kurasawa | ............. G06F 3/0446 |
| 2022/0102583 A1* | 3/2022 | Baumheinrich | ....... G02B 6/105 |
| 2023/0238400 A1 | 7/2023 | Bok et al. | |

FOREIGN PATENT DOCUMENTS

KR 10-2559962 B1 7/2023

* cited by examiner

*Primary Examiner* — Insa Sadio
(74) *Attorney, Agent, or Firm* — Womble Bond Dickinson (US) LLP

(57) ABSTRACT

A display device includes: a display part including a base layer and a light emitting element on the base layer; a sensing part on the display part, and including a sensing electrode; a multiplexer electrically connected to the sensing electrode through a sensing line, and including multiplexer (MUX) transistors on a portion of the base layer; and MUX gate lines electrically connected to the MUX transistors.

20 Claims, 13 Drawing Sheets

SPX: SPX1, SPX2, SPX3

FIG. 3

DD(TSP)

SP

BS2

SA

NSA

MUA

PDA

TPD     MUX     TPD

S: S1, S2, S3
GS: GS1, GS2, GS3, GS4
MT: MT1, MT2, MT3, MT4
MGL: MGL1, MGL2, MGL3, MGL4
SGL: SGL1, SGL2, SGL3

MGL: MGL1, MGL2, MGL3

FIG. 12

MGL: MGL1, MGL2, MGL3

1000

1000

DISPLAY DEVICE AND ELECTRONIC DEVICE INCLUDING THE SAME

CROSS-REFERENCE TO RELATED APPLICATION

The present application claims priority to and the benefit of Korean Patent Application No. 10-2024-0108051, filed on Aug. 13, 2024, in the Korean Intellectual Property Office, the entire disclosure of which is incorporated herein by reference.

BACKGROUND

1. Field

Aspects of some embodiments of the present disclosure relate to a display device and an electronic device including the display device.

2. Description of the Related Art

As interest in information displays has recently increased, requirements for display devices configured to display images have increased in various forms. In addition, research and development of display devices with touch sensors are being conducted to enhance user convenience and expand the range of application fields.

The above information disclosed in this Background section is only for enhancement of understanding of the background and therefore the information discussed in this Background section does not necessarily constitute prior art.

SUMMARY

Aspects of some embodiments of the present disclosure include a display device and an electronic device including the display device, that may be capable of relatively reducing a risk of distortion of signals for sensing touch information.

Aspects of some embodiments of the present disclosure include a display device and an electronic device including the display device, that may be capable of relatively reducing a risk of damage to wirings.

Aspects of some embodiments of the present disclosure include a display device and an electronic device including the display device, that may be capable of relatively improving the reliability of touch performance.

According to some embodiments of the present disclosure, a display device includes: a display part including a base layer and a light emitting element on the base layer; a sensing part on the display part, and including a sensing electrode; a multiplexer electrically connected to the sensing electrode through a sensing line, and including multiplexer (MUX) transistors on a portion of the base layer; and MUX gate lines electrically connected to the MUX transistors. According to some embodiments, the MUX transistors may include a first MUX transistor and a second MUX transistor. According to some embodiments, the MUX gate lines may include a first MUX gate line electrically connected to a first gate electrode of the first MUX transistor, and a second MUX gate line electrically connected to a second gate electrode of the second MUX transistor. According to some embodiments, each of the MUX gate lines may include a first MUX gate line portion extending in a first direction, and a second MUX gate line portion extending in a second direction different from the first direction, and the second MUX gate line portion is electrically connected to the first MUX gate line portion on an end of the first MUX gate line portion. According to some embodiments, the first MUX gate line portion of the first MUX gate line and the second MUX gate line portion of the second MUX gate line may not overlap each other in a plan view.

According to some embodiments, the first MUX gate line portion may include first MUX gate line portions, and the first MUX gate line portions may not overlap each other in a plan view. According to some embodiments, the second MUX gate line portion may include second MUX gate line portions, and the second MUX gate line portions may not overlap each other in a plan view.

According to some embodiments, the second MUX gate line may be closer to the MUX transistors than the first MUX gate line.

According to some embodiments, the first MUX gate line portion of the second MUX gate line may extend farther in the first direction than the first MUX gate line portion of the first MUX gate line. According to some embodiments, the second MUX gate line portion of the second MUX gate line may extend in the second direction farther outside than the second MUX gate line portion of the first MUX gate line.

According to some embodiments, the second MUX gate line portion of the first MUX gate line and the second MUX gate line portion of the second MUX gate line may be spaced apart from each other by a first distance. According to some embodiments, the first MUX gate line portion and the second MUX gate line portion of the first MUX gate line may be spaced apart from each other by a second distance in a thickness direction of the base layer. The first distance may be larger than the second distance.

According to some embodiments, the MUX gate lines may further include a third MUX gate line between the MUX transistors. According to some embodiments, the first MUX gate line portion and the second MUX gate line portion of the third MUX gate line may not overlap the first MUX gate line portion and the second MUX gate line portion of each of the first MUX gate line and the second MUX gate line in a plan view.

According to some embodiments, some of the MUX gate lines may be on a lower side of a multiplexer area where the multiplexer is located, some of the MUX gate lines may be between the MUX transistors in the multiplexer area, and some of the MUX gate lines may be on an upper side of the multiplexer area.

According to some embodiments, the first MUX gate line portion and the second MUX gate line portion may be electrically connected to each other through a contact member. According to some embodiments, the contact member may include contact members included in each of the MUX gate lines. According to some embodiments, the contact members may be sequentially arranged in an oblique direction extending in a direction between the first direction and the second direction.

According to some embodiments, in each of the MUX gate lines, the second MUX gate line portion may include second MUX gate line portions. According to some embodiments, one of the second MUX gate line portions may be electrically connected to the first MUX gate line portion on a first end of the first MUX gate line portion, and another of the second MUX gate line portions may be electrically connected to the first MUX gate line portion on a second end of the first MUX gate line portion.

According to some embodiments, the first MUX gate line portion may include first MUX gate line portions included in each of the MUX gate lines, and the first MUX gate line portions may be arranged in the second direction. According to some embodiments, the second MUX gate line portion may include second MUX gate line portions included in each of the MUX gate lines, and the second MUX gate line portions may be arranged in the first direction.

According to some embodiments, the MUX gate lines may further include a third MUX gate line between the MUX transistors. According to some embodiments, the first MUX gate line portion and the second MUX gate line portion of the third MUX gate line may not overlap the first MUX gate line portion and the second MUX gate line portion of the first MUX gate line in a plan view.

According to some embodiments, the second MUX gate line portion of the third MUX gate line may overlap the first MUX gate line portion of the second MUX gate line in a plan view.

According to some embodiments, the second MUX gate line portion of the third MUX gate line may be between the second MUX gate line portion of the first MUX gate line and the second MUX gate line portion of the second MUX gate line.

According to some embodiments, gate control signals respectively supplied from the third MUX gate line and the second MUX gate line may have a potential difference of 1 V or less.

According to some embodiments, the display device may further include a sensor driver electrically connected to the multiplexer through signal lines. According to some embodiments, the multiplexer may be on a side of a sensing area where the sensing electrode is located.

According to some embodiments, the multiplexer may select some of signals supplied through the signal lines and supply the selected signals to the sensing line.

According to some embodiments, the multiplexer may include multiplexers each including a multiplexer circuit, and some of the multiplexers may be arranged in the first direction, and some of the multiplexers may be arranged in the second direction.

According to some embodiments, the signal lines may include a first signal line configured to supply a first signal, a second signal line configured to supply a second signal, and a third signal line configured to supply a third signal. According to some embodiments, the MUX transistors may further include a third MUX transistor and a fourth MUX transistor. According to some embodiments, the MUX gate lines may further include a third MUX gate line and a fourth MUX gate line. According to some embodiments, a first electrode of the first MUX transistor may be electrically connected to the first signal line, and a second electrode of the first MUX transistor may be electrically connected to a first node. According to some embodiments, a first electrode of the second MUX transistor may be electrically connected to the second signal line, and a second electrode of the second MUX transistor may be electrically connected to the first node. According to some embodiments, a first electrode of the third MUX transistor may be electrically connected to the first node, a second electrode of the third MUX transistor may be electrically connected to a second node, and a third gate electrode of the third MUX transistor may be electrically connected to the third MUX gate line. According to some embodiments, a first electrode of the fourth MUX transistor may be electrically connected to the third signal line, a second electrode of the fourth MUX transistor may be electrically connected to the second node, and a fourth gate electrode of the fourth MUX transistor may be electrically connected to the fourth MUX gate line. According to some embodiments, the second node may be electrically connected to the sensing line.

According to some embodiments, the multiplexer may selectively supply any one of the first signal, the second signal, and the third signal to the sensing line. According to some embodiments, the first MUX gate line may supply a first gate control signal. According to some embodiments, the second MUX gate line may supply a second gate control signal. According to some embodiments, the third MUX gate line may supply a third gate control signal. According to some embodiments, the fourth MUX gate line may supply a fourth gate control signal. According to some embodiments, the first gate control signal, the second gate control signal, the third gate control signal, and the fourth gate control signal may have different potentials.

According to some embodiments, the sensing electrode may acquire information about a user touch input using a self-capacitance method.

According to some embodiments, the display part may include a light-emitting-element layer including the light emitting element, and an encapsulation layer on the light-emitting-element layer. According to some embodiments, the sensing part may be directly located on the encapsulation layer.

According to some embodiments, the display part may include a circuit layer including a pixel transistor electrically connected to the light emitting element. According to some embodiments, the first MUX gate line portion may include material identical to material of a source/drain electrode of the pixel transistor. According to some embodiments, the second MUX gate line portion may include material identical to material of a conductive portion in the circuit layer electrically connected to the light emitting element.

Aspects of some embodiments of the present disclosure may include an electronic device including: a processor configured to provide input image data; a display device configured to display an image based on the input image data; and a power supply configured to supply power to the display device. According to some embodiments, the display device may include: a display part including a base layer and a light emitting element on the base layer; a sensing part on the display part, and including a sensing electrode; a multiplexer electrically connected to the sensing electrode through a sensing line, and including multiplexer (MUX) transistors on a portion of the base layer; and MUX gate lines electrically connected to the MUX transistors. According to some embodiments, the MUX transistors may include a first MUX transistor and a second MUX transistor. According to some embodiments, the MUX gate lines may include a first MUX gate line electrically connected to a first gate electrode of the first MUX transistor, and a second MUX gate line electrically connected to a second gate electrode of the second MUX transistor. According to some embodiments, each of the MUX gate lines may include a first MUX gate line portion extending in a first direction, and a second MUX gate line portion extending in a second direction different from the first direction, and the second MUX gate line portion may be electrically connected to the first MUX gate line portion on an end of the first MUX gate line portion. According to some embodiments, the first MUX gate line portion of the first MUX gate line and the second MUX gate line portion of the second MUX gate line may not overlap each other in a plan view.

BRIEF DESCRIPTION OF THE DRAWINGS

FIG. 3 is a schematic plan view illustrating a sensing part according to some embodiments.

FIG. 6 is a schematic plan view illustrating a sensing area and a multiplexer area according to some embodiments.

FIG. 12 is a schematic plan view illustrating a multiplexer and an area surrounding the multiplexer, according to some embodiments.

DETAILED DESCRIPTION

Figure 1:
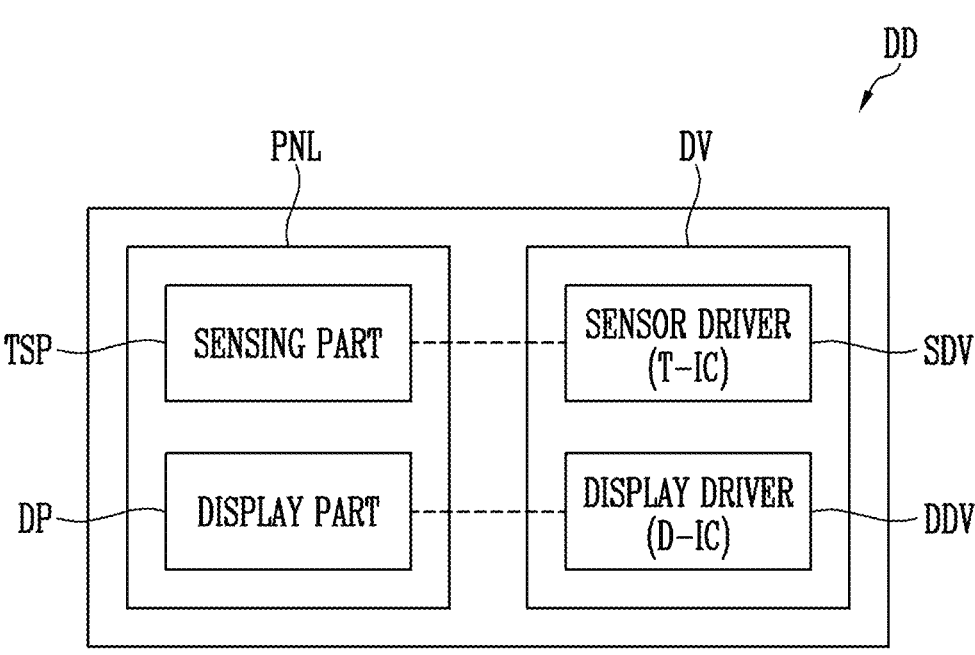
FIG. 1 is a schematic diagram for describing a display device according to some embodiments.

As the present disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element. In the present disclosure, the singular forms are intended to include the plural forms as well, unless the context clearly indicates otherwise.

Some embodiments are described in the accompanying drawings in connection with functional blocks, units and/or modules. Those skilled in the art will understand that such blocks, units, and/or modules are physically implemented by logic circuits, discrete components, microprocessors, hard-wired circuits, memory elements, wiring connections, and other electronic circuits. This may be formed using semiconductor-based fabrication techniques or other fabrication techniques. For blocks, units, and/or modules implemented by a microprocessor or other similar hardware, they may be programmed and controlled using software to perform various functions discussed herein, and may be optionally driven by firmware and/or software. In addition, each block, unit, and/or module may be implemented by dedicated hardware, or be implemented by a combination of the dedicated hardware which performs some functions and a processor which performs different functions (e.g. one or more programmed microprocessors and related circuits). Furthermore, in some embodiments, blocks, units and/or modules may be physically separated into two or more individual blocks, units and/or modules which interact with each other without departing from the scope of the inventive concept. In some embodiments, blocks, units and/or modules may be physically combined into more complex blocks, units and/or modules without departing from the scope of the inventive concept.

It will be further understood that the terms "comprise", "include", "have", etc. when used in the present disclosure, specify the presence of stated features, integers, steps, operations, elements, components, and/or combinations of them but do not preclude the presence or addition of one or more other features, integers, steps, operations, elements, components, and/or combinations thereof. Furthermore, in case that a first part such as a layer, a film, a region, or a plate is on a second part, the first part may be not only directly on the second part but a third part may intervene between them. In addition, when it is expressed that a first part such as a layer, a film, a region, or a plate is formed on a second part, the surface of the second part on which the first part is formed is not limited to an upper surface of the second part but may include other surfaces such as a side surface or a lower surface of the second part. To the contrary, in case that a first part such as a layer, a film, a region, or a plate is under a second part, the first part may be not only directly under the second part but a third part may intervene between them.

Various embodiments of the present disclosure relate to a display device and an electronic device including the display device. Hereinafter, a display device and an electronic device including the display device according to some embodiments will be described with reference to the attached drawings.

Hereinafter, a display device DD according to some embodiments will be described with reference to FIGS. 1 to 5.

Figure 2:
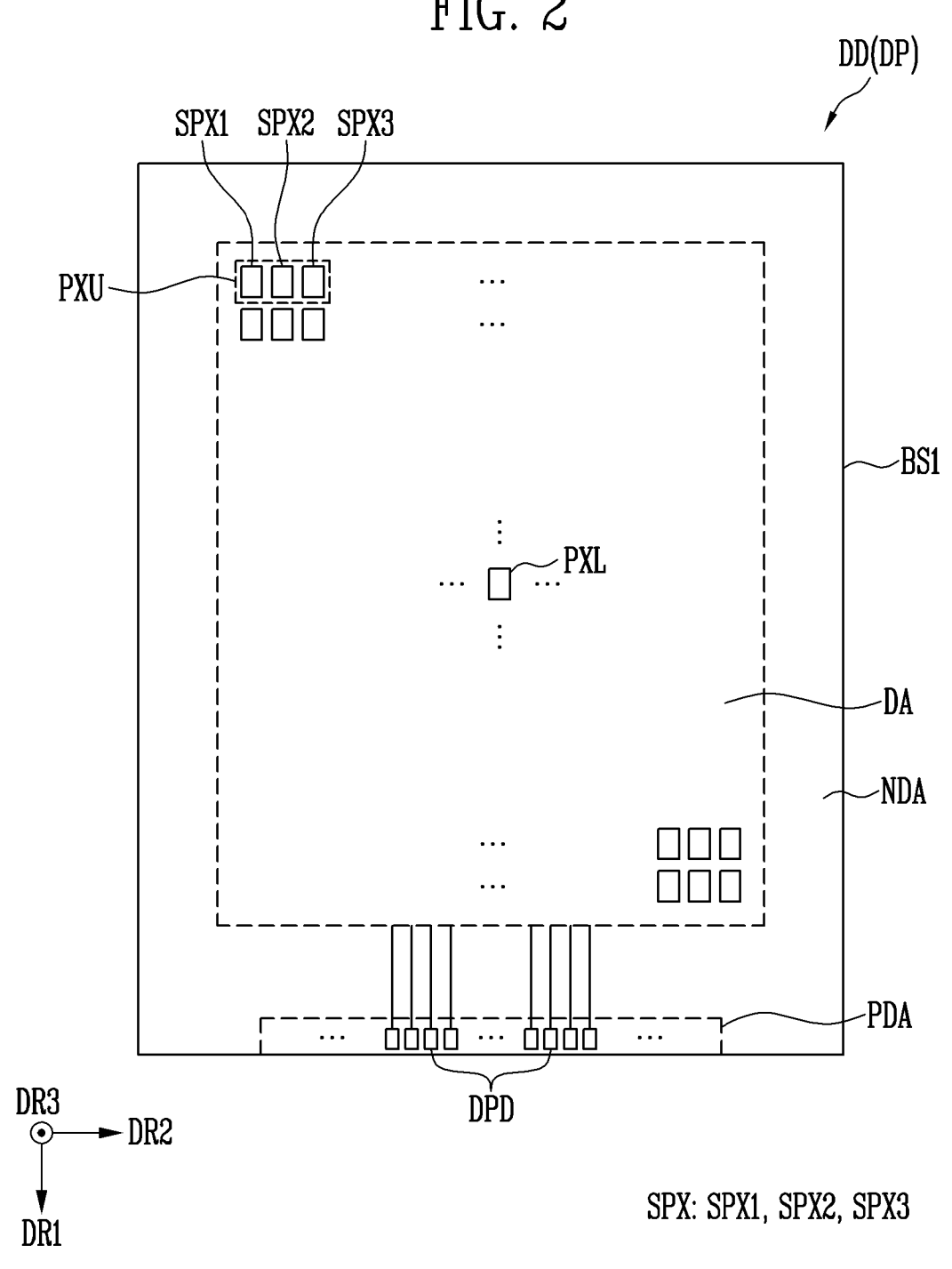
FIG. 2 is a schematic plan view illustrating a display part according to some embodiments.
Figure 3:
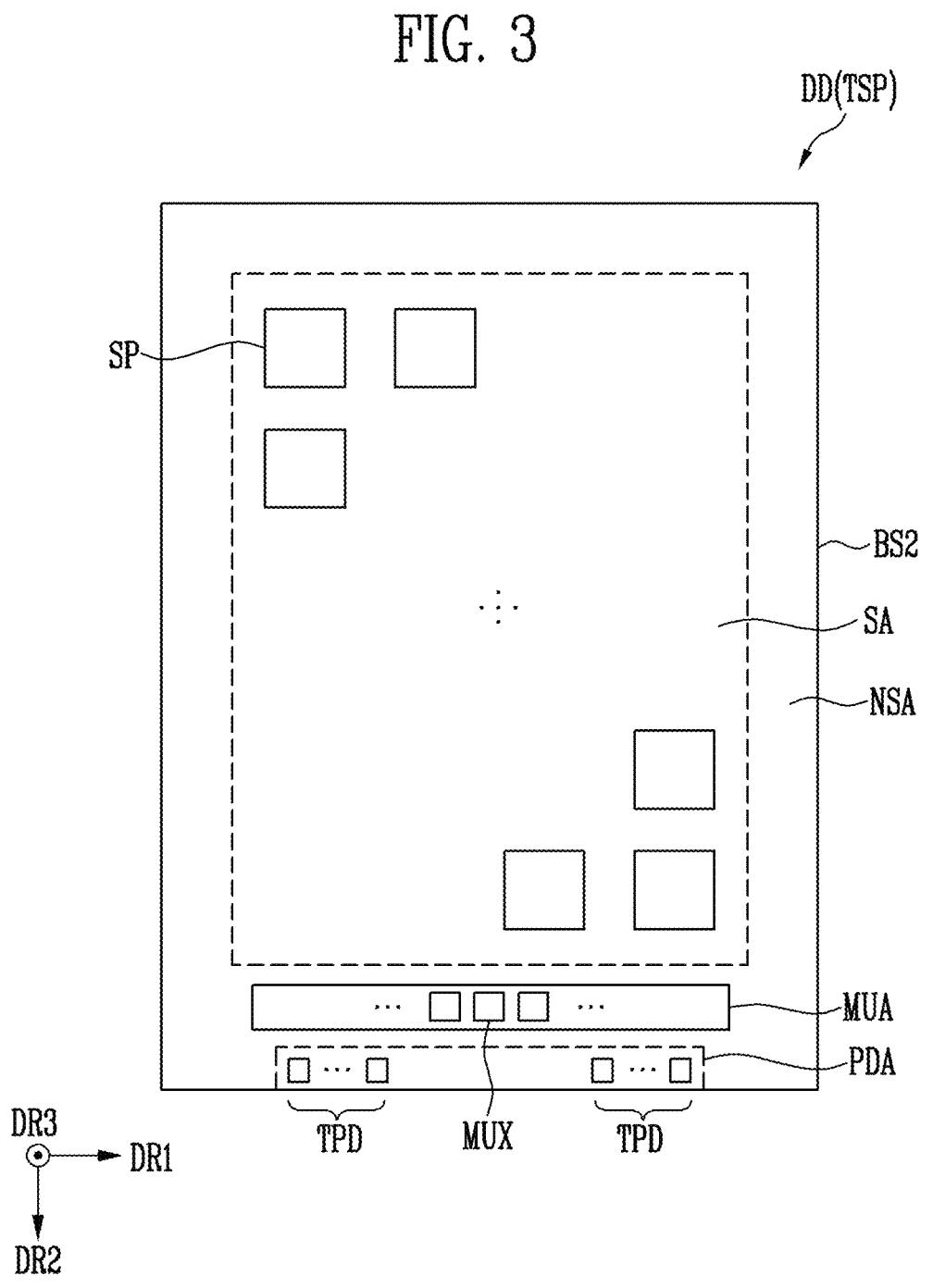
Figure 4:
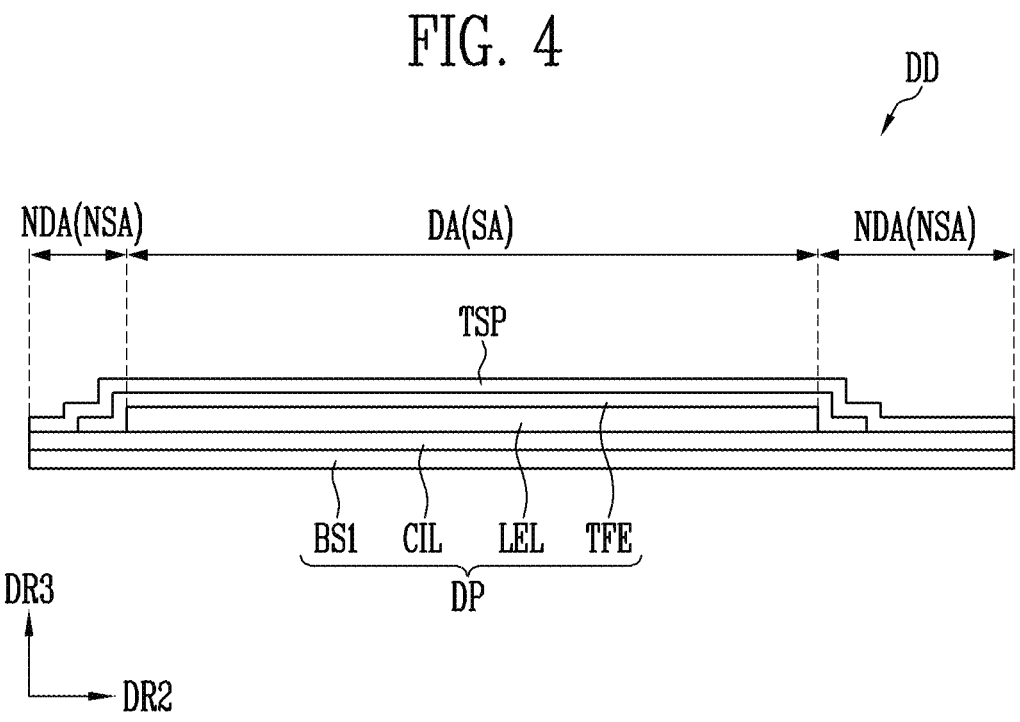
FIG. 4 is a schematic sectional view illustrating a display device according to some embodiments.
Figure 5:
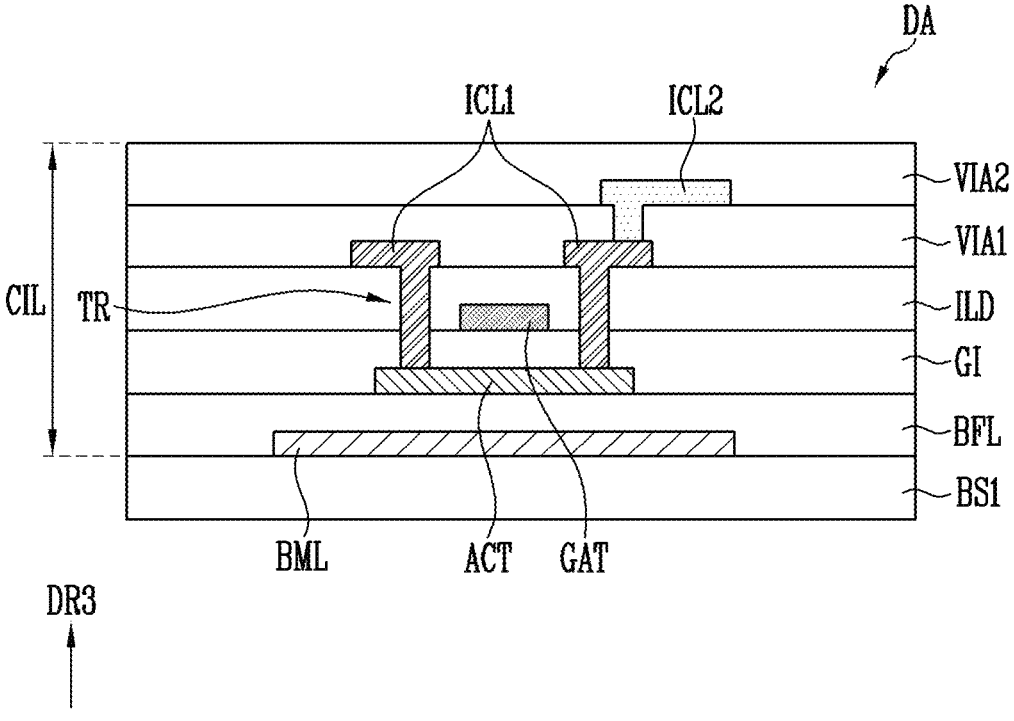
FIG. 5 is a schematic sectional view illustrating a circuit layer in a display area according to some embodiments.

FIG. 1 is a schematic diagram for describing the display device DD according to some embodiments. FIG. 2 is a schematic plan view illustrating a display part DP according to some embodiments. FIG. 3 is a schematic plan view illustrating a sensing part TSP according to some embodiments. FIG. 4 is a schematic sectional view illustrating the display device DD according to some embodiments. FIG. 5 is a schematic sectional view illustrating a circuit layer CIL in a display area DA according to some embodiments.

Referring to FIGS. 1 and 5, the display device DD is configured to provide (or emit) light. According to some embodiments, the display device DD may be applied to various devices, and the applicable device is not limited to a specific example.

The display device DD may include a panel PNL, and a driving circuit component DV configured to drive the panel PNL.

The panel PNL may include the display part DP configured to display an image, and the sensing part TSP configured to sense a user input (e.g., touch input).

The display part DP may include pixels PXL. The sensing part TSP may include sensing electrodes SP.

The driving circuit component DV may include a display driver (D-IC) DDV configured to drive the display part DP, and a sensor driver (T-IC) SDV configured to drive the sensing part TSP.

According to some embodiments, the display part DP may be referred to as a display layer or a display panel. The sensing part TSP may be referred to as a sensing layer, a sensing panel, or a touch sensor.

The pixels PXL may display images in units of each display frame period. The sensing electrodes SP may sense an input (e.g., touch input) from the user in units of each sensing frame period. According to some embodiments, the sensing frame period and the display frame period may be independent from each other, or may be different from each other. The sensing frame period and the display frame period may be synchronized with each other, or may be asynchronous.

Figure 7:
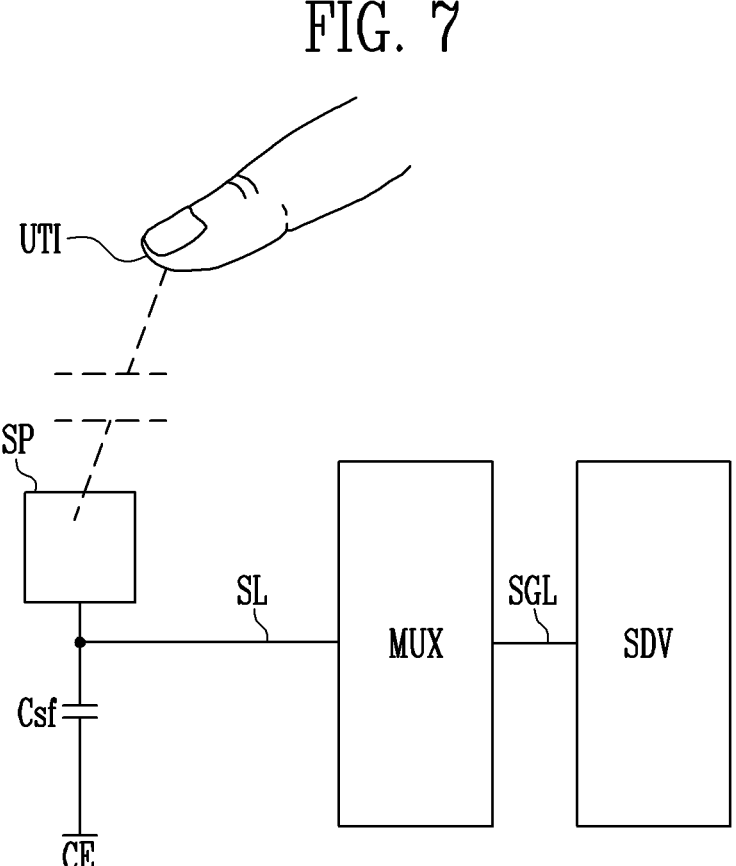
FIG. 7 is a schematic view for describing an operation of sensing a touch input by the sensing part, according to some embodiments.

The sensing part TSP including the sensing electrodes SP may obtain information about a user touch input UTI (refer to FIG. 7). Information about the touch input (or a touch event) may mean information including a position or the like of a touch provided from the user.

A first base layer BS1 may be a base substrate or a base component for supporting the display device DD. The first base layer BS1 may be a rigid substrate made of glass. Alternatively, the first base layer BS1 may be a flexible substrate. In this case, the base layer may include insulating material such as polymer resin, e.g., polyimide. However, embodiments according to the present disclosure are not particularly limited to the foregoing.

The display device DD (or the display part DP) may include a display area DA and a non-display area NDA. The non-display area NDA may enclose at least a portion of the display area DA. The non-display area NDA may be arranged around a periphery (e.g., outside a footprint) of the display area DA.

The pixels PXL, and scan lines and data lines that are electrically connected to the pixels PXL may be located in the display area DA.

The pixels PXL may be supplied with data signals from the data lines based on turn-on level scan signals supplied from the scan lines, and may emit light having luminance corresponding to the data signals. Consequently, an image corresponding to the data signals may be displayed in the display area DA.

The pixels PXL may be arranged in the display area DA according to an arrangement structure. For example, the pixels PXL may be arranged according to a stripe or PENTILE™ arrangement or structure. However, embodiments according to the present disclosure are not limited to the foregoing example.

Each of the pixels PXL (or sub-pixels SPX) may include a first sub-pixel SPX1, a second sub-pixel SPX2, and a third sub-pixel SPX3. At least one first sub-pixel SPX1, at least one second sub-pixel SPX2, and at least one third sub-pixel SPX3 may form a pixel unit PXU which may emit various colors of light.

For example, each of the first sub-pixel SPX1, the second sub-pixel SPX2, and the third sub-pixel SPX3 may emit a single color of light. For instance, the first sub-pixel SPX1 may be a red pixel configured to emit light in red (e.g., first color), the second sub-pixel SPX2 may be a green pixel configured to emit light in green (e.g., second color), and the third sub-pixel SPX3 may be a blue pixel configured to emit light in blue (e.g., third color).

Various wirings and/or internal circuits which are connected to the pixels PXL of the display area DA may be located in the non-display area NDA. For example, a plurality of wirings for supplying various power voltages and control signals to the display area DA may be located in the non-display area NDA.

The sensing part TSP may obtain information about input provided from the user. The sensing part TSP may be configured to recognize touch inputs.

The display device DD (or the sensing part TSP) may include a sensing area SA and a non-sensing area NSA.

According to some embodiments, the sensing area SA may be arranged to overlap at least one area of the display area DA. For example, the sensing area SA may be set to an area corresponding to the display area DA (e.g., an area overlapping the display area DA). The non-sensing area NSA may be set to an area corresponding to the non-display area NDA (e.g., an area overlapping the non-display area NDA). In this case, when a touch input or the like is provided to the display area DA, the sensing part TSP may detect the touch input.

A second base layer BS2 may include one or more insulating layers. For example, an insulating layer (e.g., an inorganic insulating layer) for forming the second base layer BS2 may be located (e.g., directly located) on the display part DP (e.g., an encapsulation layer TFE), thereby forming a base for forming the sensing electrodes SP. However, an example pertaining to forming the second base layer BS2 is not particularly limited.

The sensing area SA may be set to an area (e.g., an active area of the sensor) capable of responding to touch input. To this end, the sensing electrodes SP for sensing the touch input or the like may be located in the sensing area SA.

The sensing electrodes SP may acquire information about the user touch input UTI by using a self-capacitance method.

The sensing electrodes SP may be arranged in various structures in the sensing area SA. For example, the sensing electrodes SP may be arranged in a second direction DR2. The sensing electrodes SP may be arranged in a first direction DR1. The sensing electrodes SP may be arranged in a matrix pattern defined based on the second direction DR2 and the first direction DR1. However, the present disclosure is not limited to the aforementioned example. For example, the sensing electrodes SP may be arranged in a circular or elliptical shape, or may be arranged obliquely.

According to some embodiments, the first direction DR1 and the second direction DR2 may be different from each other. The first direction DR1 and the second direction DR2 may be perpendicular to each other. However, the present disclosure is not limited to the foregoing example. For example, the first direction DR1 and the second direction DR2 may extend obliquely relative to one another.

According to some embodiments, the sensing electrodes SP may have various shapes. For example, the sensing electrodes SP may have various shapes such as rectangular, triangular, circular, elliptical, or mesh form.

According to some embodiments, the sensing electrodes SP may include conductive material. For example, the sensing electrodes SP may include at least one of metal, transparent conductive material, or other various conductive materials, thus having conductivity. For example, the sensing electrodes SP may include at least one of various metals including gold (Au), silver (Ag), aluminum (Al), molybdenum (Mo), chrome (Cr), titanium (Ti), nickel (Ni), neodymium (Nd), copper (Cu), platinum (Pt), or the like, or an alloy thereof. The sensing electrodes SP may include at least one of various transparent conductive materials including silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), a carbon nanotube, or graphene. Each of the sensing electrodes SP may be formed of a single layer or multiple layers, and the cross-sectional structure thereof is not particularly limited.

The panel PNL may include a pad area PDA. The panel PNL may include display pads DPD and touch sensing pads TP D that are located in the pad area PDA.

The display pads DPD may be electrically connected to the pixels PXL in the display area DA through wirings. The display pads DPD may be electrically connected to the display driver DDV formed (e.g., included) in the driving circuit component DV. For example, electrical signals provided from the display driver DDV may be applied to the pixels PXL through the display pads DPD.

The touch sensing pads TPD may be electrically connected to the sensing electrodes SP through wirings and a multiplexer MUX. The touch sensing pads TPD may be electrically connected to the sensor driver SDV formed (e.g., included) in the driving circuit component DV. For example, electrical signals provided from the sensor driver SDV may be applied to the sensing electrodes SP through the touch sensing pads TPD.

The driving circuit component DV may include a flexible circuit substrate. The driving circuit component DV may be implemented as an integrated circuit (IC).

The driving circuit component DV may include the display driver DDV and the sensor driver SDV. The driving circuit component DV may be formed on a rear surface of the first base layer BS1.

The display driver DDV may be electrically connected to the display part DP, and may be configured to drive the display part DP. The display driver DDV may be formed on the rear surface of the first base layer BS1, and may be electrically connected to the pixels PXL through the display pads DPD. The display driver DDV may include a data driver, a timing controller, a scan driver, and so on.

The sensor driver SDV may be electrically connected to the sensing part TSP, and may be configured to drive the sensing part TSP. The sensor driver SDV may be formed on the rear surface of the first base layer BS1, and may be electrically connected to the sensing electrodes SP through the touch sensing pads TPD. The sensor driver SDV may include a sensing transmitter and a sensing receiver.

The panel PNL (e.g., the sensing part TSP) may include a multiplexer area MUA. The panel PNL (e.g., the sensing part TSP) may include multiplexers MUX located in the multiplexer area MUA.

The multiplexer area MUA may be located between the sensing area SA and the pad area PDA. The multiplexer area MUA may be located on a side of the sensing area SA. Electrical signals supplied through the touch sensing pads TP D may be applied to the sensing electrodes SP via the multiplexers MUX.

An electrical connection relationship, etc., between the multiplexers MUX and the sensing electrodes SP will be described later with reference to the drawings following FIG. 6.

Referring to FIG. 4, according to some embodiments, the display part DP may include a circuit layer CIL, a light-emitting-element layer LEL, and an encapsulation layer TFE that are located on the first base layer BS1.

The circuit layer CIL may be arranged across the display area DA and the non-display area NDA, and may be located on the first base layer BS1. The circuit layer CIL is config-ured to drive the sub-pixels SPX, and may include a pixel circuit that is electrically connected to the light emitting elements. The circuit layer CIL may include MUX transistors MT (refer to FIG. 8) that form each of the multiplexers MUX.

The light-emitting-element layer LEL may be located on the circuit layer CIL in the display area DA. The light-emitting-element layer LEL may include light emitting elements LD configured to emit light. The light emitting elements may be formed of organic light emitting diodes (LED) including organic material, and may include inor-ganic light emitting diodes (e.g., micro LEDs) including inorganic material. However, the present disclosure is not limited to the aforementioned example.

The encapsulation layer TFE may cover the light-emit-ting-element layer LEL. At least a portion of the encapsu-lation layer TFE may be located in the display area DA. The encapsulation layer TFE may encapsulate the light-emitting-element layer LEL.

The sensing part TSP may be arranged across the sensing area SA and the non-sensing area NSA. At least a portion of the sensing part TSP may be located (e.g., directly located) on the encapsulation layer TFE.

According to some embodiments, the sensing part TSP may be fabricated in such a way that the sensing part TSP is formed on the encapsulation layer TFE rather than being located on a separate substrate and coupled to the display part DP. Hence, a process of fabricating the display device DD may be simplified.

FIG. 5 schematically illustrates an example of a cross-section of the circuit layer CIL in the display area DA according to some embodiments. Referring to FIG. 5, the circuit layer CIL may include a plurality of insulating layers and a plurality of conductive layers that are located on the first base layer BS1.

For example, the circuit layer CIL may include a bottom conductive layer BML, a buffer layer BFL, an active layer ACT, a gate insulating layer GI, a gate conductive layer GAT, an inter layer dielectric IDL, a first interlayer conduc-tive layer ICL1, a first via layer VIA1, a second interlayer conductive layer ICL2, and a second via layer VIA2 that are arranged (e.g., sequentially arranged) in a thickness direc-tion of the first base layer BS1 (e.g., in a third direction DR3). The circuit layer CIL may form a MUX transistor MT and a pixel circuit including a pixel transistor TR formed by patterning the respective layers.

The buffer layer BFL may be located on the first base layer BS1. The buffer layer BFL may prevent or reduce diffusion of contaminants or impurities into or penetration of water into the active layer ACT.

The active layer ACT may be located on the buffer layer BFL. The active layer ACT may include a semiconductor. For example, the active layer ACT may include one or more of polysilicon, low temperature polycrystalline silicon (LTPS), amorphous silicon, and an oxide semiconductor.

The bottom conductive layer BML, the gate conductive layer GAT, the first interlayer conductive layer ICL1, and the second interlayer conductive layer ICL2 may include con-ductive material, and may each have a single-layer or multilayer structure. According to some embodiments, the gate conductive layer GAT may form a gate electrode of the pixel transistor TR. A first portion and a second portion of the first interlayer conductive layer ICL1 may respectively form a source electrode and a drain electrode of the pixel transistor TR.

According to some embodiments, the portion of the first interlayer conductive layer ICL1 that forms the pixel tran-sistor TR may be electrically connected to the light emitting element (or an anode electrode of the light emitting element) through at least a portion of the second interlayer conductive layer ICL2.

According to some embodiments, the first interlayer conductive layer ICL1 may be a first source/drain electrode layer, and the second interlayer conductive layer ICL2 may be a second source/drain electrode layer.

The buffer layer BFL, the gate insulating layer GI, the interlayer insulating layer ILD, the first via layer VIA1, and the second via layer VIA2 may be located adjacent to the conductive layers included in the circuit layer CIL, and may include various insulating materials such as inorganic materials and/or organic materials. At least some of the conductive layers may be electrically connected to each other through a contact member passing through at least one of the insulating layers.

The sensing part including a multiplexer MUX according to some embodiments will be described in more detail with reference with FIGS. 6 to 9. For the sake of convenience in explanation, some descriptions of content that overlap the contents described above may be simplified or omitted.

Figure 6:
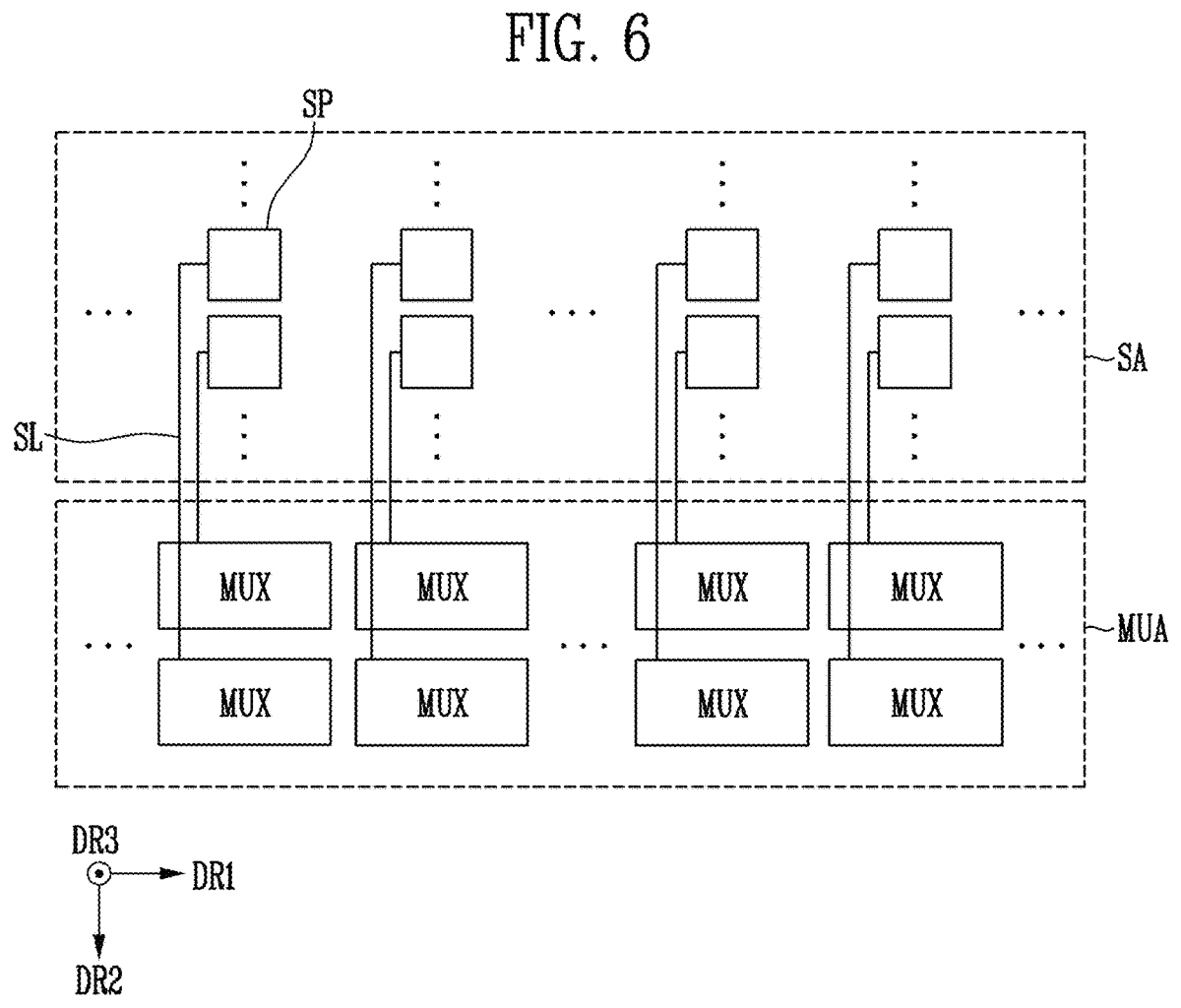
Figure 8:
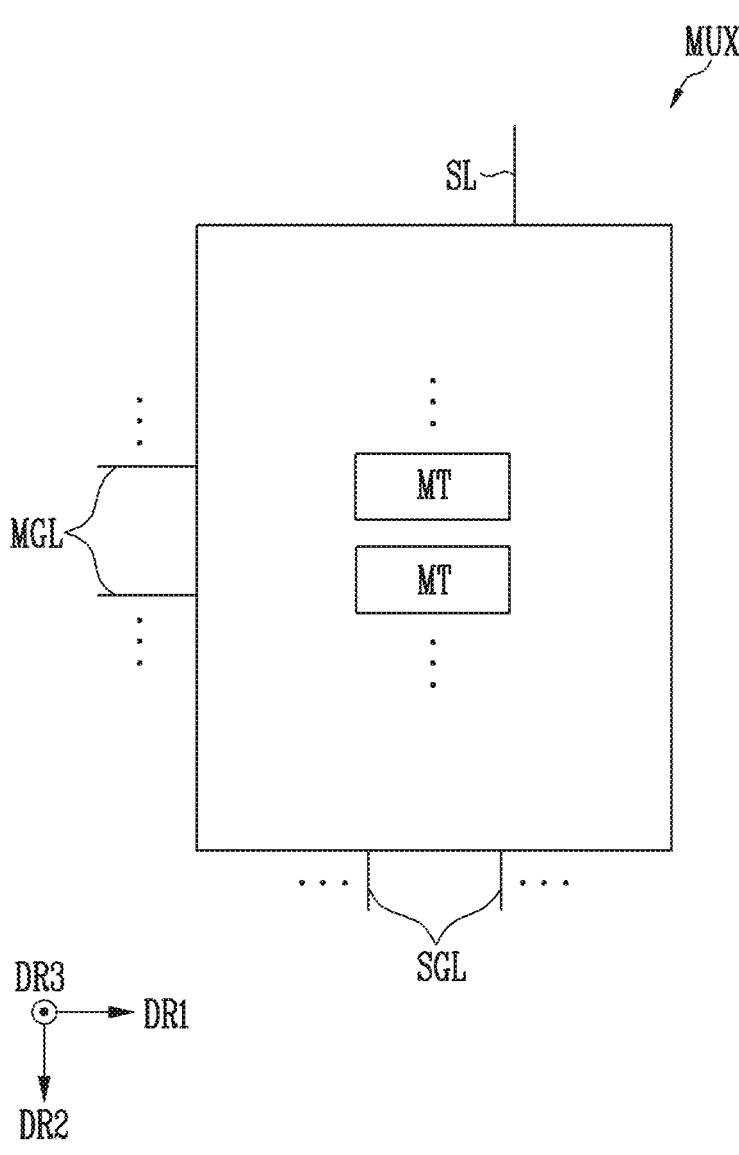
FIGS. 8 and 9 are schematic plan views illustrating a multiplexer and lines electrically connected to the multiplexer, according to some embodiments.
Figure 9:
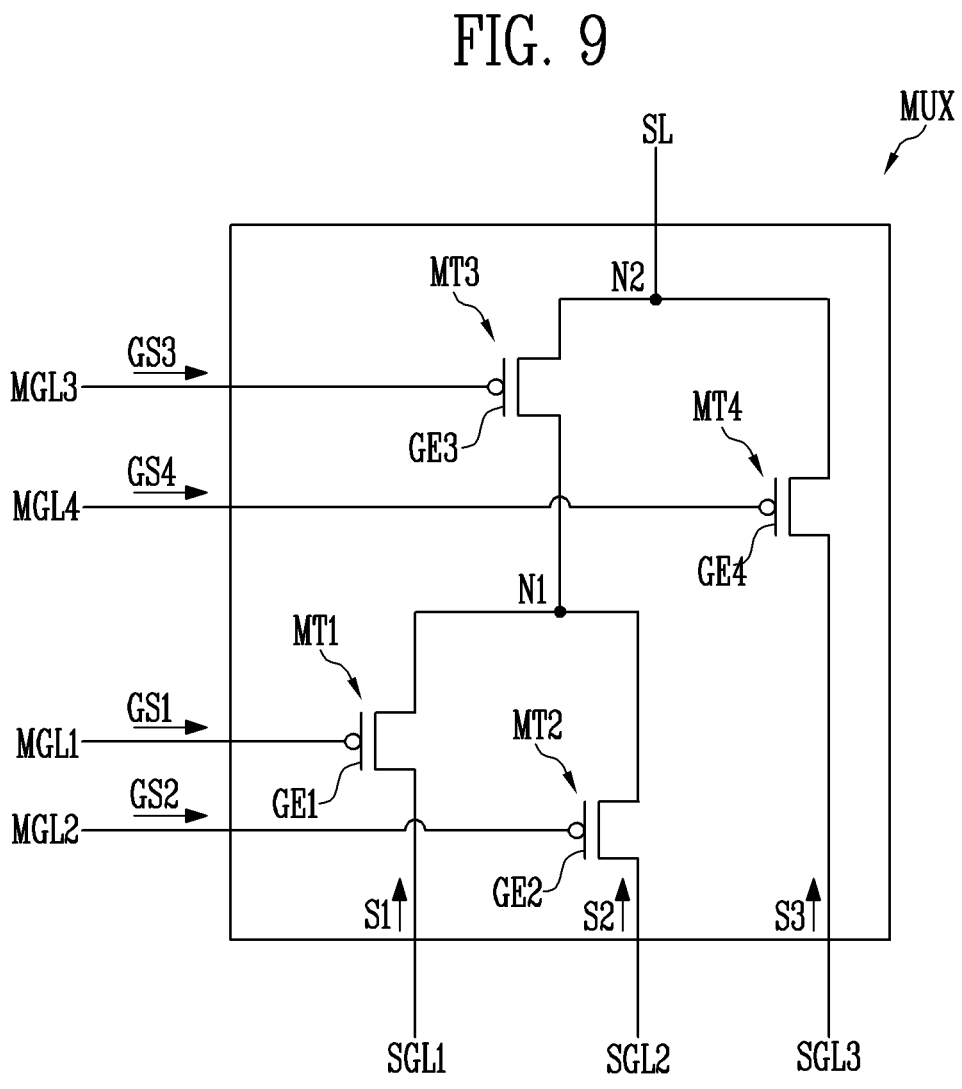

FIG. 6 is a schematic plan view illustrating the sensing area SA and the multiplexer area MUA according to some embodiments. FIG. 7 is a schematic view for describing an operation of sensing a touch input by the sensing part, according to some embodiments. FIGS. 8 and 9 are schematic plan views illustrating the multiplexer MUX and lines electrically connected to the multiplexer MUX, according to some embodiments.

According to some embodiments with reference to FIGS. 6 and 7, the display device DD (or the panel PNL) may include a sensing line SL and a signal line SGL.

The sensing line SL may electrically connect the multiplexer MUX located in the multiplexer area MUA to a sensing electrode SP in the sensing area SA. According to some embodiments, the signal line SGL may electrically connect the multiplexer MUX to the sensor driver SDV. Accordingly, a sensing signal provided from the sensor driver SDV may be applied to the sensing electrode SP through the signal line SGL, the multiplexer MUX, and the sensing line SL.

At least a portion of the sensing line SL may extend in the second direction DR2. Accordingly, the sensing electrode SP and the multiplexer MUX spaced apart from each other in the second direction DR2 may be electrically connected to each other.

The multiplexer MUX may be electrically connected to one or more sensing electrodes SP. For example, the multiplexer MUX may include multiplexers MUX each including a multiplexer circuit. Each of the multiplexers MUX may be electrically connected to one or more sensing electrodes SP. The multiplexer MUX may apply an electrical signal supplied through any one of the signal lines SGL to the sensing electrode SP through the sensing line SL.

The multiplexers MUX may be arranged (e.g., sequentially arranged) in the first direction DR1. The multiplexers MUX may be arranged (e.g., sequentially arranged) in the second direction DR2. In this way, the plurality of multiplexers MUX may be arranged in the multiplexer area MUA.

According to some embodiments, the sensor driver SDV may acquire information about a user touch input UTI by using a self-capacitance method. According to some embodiments, the display device DD (or the panel PNL) may include a capacitance electrode CE. According to some embodiments, the capacitance electrode CE may be at least any one of the electrodes of the display part DP. For example, the capacitance electrode CE may be a cathode electrode of a light emitting element. However, the present disclosure is not limited to the foregoing example.

According to some embodiments, the sensor driver SDV may charge or discharge the sensing electrode SP through the signal line SGL, the multiplexer MUX, and the sensing line SL, and may obtain information about the user touch input UTI by detecting changes in the capacitance of the sensing electrode SP. The information about the user touch input UTI may include a location of the user touch input UTO, whether the user touch input UTI is present, and so on.

For example, a reference voltage provided from the sensor driver SDV may be applied to the sensing electrode SP. In the case where the user touch input UTI is applied, a self-capacitance Csf may be formed between the sensing electrode SP and the capacitance electrode CE. The reference voltage may be changed to voltage information with a waveform modified by the self-capacitance. The sensor driver SDV may receive the changed voltage information, and may analyze the change voltage information and determine the location of the user touch input UTI, whether the user touch input UTI is present, and so on.

According to some embodiments, the multiplexer MUX may receive an electrical signal through the signal line SGL, and may output an electrical signal through the sensing line SL. According to some embodiments, the number of signal lines SGL may be larger than the number of sensing lines SL.

According to some embodiments, the multiplexer MUX may select some of electrical signals supplied through the signal lines SGL and supply the selected electrical signals to the corresponding sensing line SL.

For example, the display device DD (or the panel PNL) may include a MUX gate line MGL. The multiplexer MUX may include two or more MUX transistors MT. The number of MUX transistors MT according to some embodiments is not limited to a specific example.

There may be multiple MUX gate lines MGL, which can be connected to corresponding MUX transistors MT. Each of the MUX gate lines MGL may be electrically connected to a gate electrode of the corresponding MUX transistor MT. The MUX gate line MGL may turn on the corresponding MUX transistor MT.

Accordingly, the operation of the MUX transistors MT may be controlled by using the MUX gate lines MGL, whereby some of electrical signals supplied through the signal lines SGL may be selected and applied to the corresponding sensing lines SL.

FIG. 9 illustrates a circuit structure of the multiplexer MUX according to some embodiments. Here, the structure of the multiplexer MUX is not limited to the circuit structure of FIG. 9. Although FIG. 9 illustrates various components in a multiplexer MUX according to some embodiments, according to various embodiments the multiplexer MUX may include additional components or fewer components without departing from the spirit and scope of embodiments according to the present disclosure.

Referring to FIG. 9, the multiplexer MUX may select any one of applied signals S and apply the selected signal S to the corresponding sensing line SL. For example, the signals S may include a first signal S1, a second signal S2, and a third signal S3.

The multiplexer MUX may include a plurality of MUX transistors MT. For example, the MUX transistors MT may include a first MUX transistor MT1, a second MUX transistor MT2, a third MUX transistor MT3, and a fourth MUX transistor MT4.

The signal line SGL may includes multiple signal lines SGL. For example, the multiple signal lines SGL may include a first signal line SGL1, a second signal line SGL2, and a third signal line SGL3.

The MUX gate line MGL may include multiple MUX gate lines MGL, and may provide gate control signals GS. For example, the MUX gate lines SGL may include a first MUX gate line MGL1, a second MUX gate line MGL2, a third MUX gate line MGL3, and a fourth MUX gate line MGL4. For example, the gate control signals GS may include a first gate control signal GS1, a second gate control signal GS2, a third gate control signal GS3, and a fourth gate control signal GS4.

According to some embodiments, a first electrode of the first MUX transistor MT1 may be electrically connected to the first signal line SGL1. A second electrode of the first MUX transistor MT1 may be electrically connected to a first node N1. A first gate electrode GE1 of the first MUX transistor MT1 may be electrically connected to the first MUX gate line MGL1. The first MUX transistor MT1 may be turned on when the first gate control signal GS1 is applied from the first MUX gate line MGL1 thereto, thus electrically connecting the first signal line SGL1 to the first node N1.

According to some embodiments, a first electrode of the second MUX transistor MT2 may be electrically connected to the second signal line SGL2. A second electrode of the second MUX transistor MT2 may be electrically connected to the first node N1. A second gate electrode GE2 of the second MUX transistor MT2 may be electrically connected to the second MUX gate line MGL2. The second MUX transistor MT2 may be turned on when the second gate control signal GS2 is applied from the second MUX gate line MGL2 thereto, thus electrically connecting the second signal line SGL2 to the first node N1.

According to some embodiments, a first electrode of the third MUX transistor MT3 may be electrically connected to the first node N1. A second electrode of the third MUX transistor MT3 may be electrically connected to a second node N2. A third gate electrode GE3 of the third MUX transistor MT3 may be electrically connected to the third MUX gate line MGL3. The third MUX transistor MT3 may be turned on when the third gate control signal GS3 is applied from the third MUX gate line MGL3 thereto, thus electrically connecting the first node N1 to the second node N2.

According to some embodiments, a first electrode of the fourth MUX transistor MT4 may be electrically connected to the third signal line SGL3. A second electrode of the second MUX transistor MT4 may be electrically connected to the second node N2. A fourth gate electrode GE4 of the fourth MUX transistor MT4 may be electrically connected to the fourth MUX gate line MGL4. The fourth MUX transistor MT4 may be turned on when the fourth gate control signal GS4 is applied from the fourth MUX gate line MGL4 thereto, thus electrically connecting the third signal line SGL3 to the second node N2.

The operation of the first to fourth MUX transistors MT1 to MT4 may be controlled by the first to fourth MUX gate lines MGL1 to MGL4. Any one of the first to third signals S1 to S3 may be applied to the sensing line SL.

The first signal S1 may be applied from the first signal line SGL1 to the sensing line SL and the sensing electrode SP when the first and third MUX transistors MT1 and MT3 are turned on and the second and fourth MUX transistors MT2 and MT4 are not turned on. The first signal S1 may be a sensing driving signal for sensing the user touch input UTI at a location at which the sensing electrode SP electrically connected to the sensing line SL is located.

The second signal S2 may be applied from the second signal line SGL2 to the sensing line SL and the sensing electrode SP when the second and third MUX transistors MT2 and MT3 are turned on and the first and fourth MUX transistors MT1 and MT4 are not turned on. The second signal S2 may be a first auxiliary sensing signal used to determine information about the user touch input UTI when another sensing electrode SP senses the user touch input UTI in an area adjacent to the location where the sensing electrode SP electrically connected to the sensing line SL is located.

The third signal S3 may be applied from the third signal line SGL3 to the sensing line SL and the sensing electrode SP when the fourth MUX transistor MT4 is turned on and the first to third MUX transistors MT1 to MT3 are not turned on. The third signal S3 may be a second auxiliary sensing signal applied to the corresponding sensing electrode SP when the user touch input UTI is not detected at the location where the sensing electrode SP electrically connected to the sensing line SL is located, nor in the area surrounding the location.

According to some embodiments, the multiplexer MUX may apply any one of the first to third signals S1 to S3 to the sensing electrode SP through the sensing line SL. As a result, wiring complexity may be relatively reduced, and while the size of the non-display area NDA (or the non-sensing area NSA) may be relatively reduced, the sensing electrode SP may acquire information about the user touch input UTI with improved reliability by using the first to third signals S1 to S3.

According to some embodiments, the first to third signals S1 to S3 may have different electrical information. For example, the first to third signals S1 to S3 may have different waveforms, different potentials, and/or different phases.

According to some embodiments, the first to fourth gate control signals GS1 to GS4 supplied to the first to fourth MUX gate lines MGL1 to MGL4 may have different electrical information. For example, the first to fourth gate control signals SG1 to SG4 may have different potentials.

In this case, when the gate control signals G are applied to the multiplexer MUX to operate the multiplexer MUX, voltages with different potentials may be applied to the respective MUX gate lines MGL.

Experimentally, in the case where wirings are excessively adjacent to each other, there is a risk that electrical signals may be distorted when voltages with different potentials are applied to the wirings. In addition, there may be concerns about risks such as corrosion occurring in the wirings in harsh environments (for example, high-temperature and/or high-humidity conditions).

Aspects of some embodiments of the present disclosure may include the MUX gate lines MGL and the multiplexer MUX capable of relatively reducing (e.g., substantially reducing) the aforementioned risks. With regard to this, further details will be explained with reference to FIG. 10 and the following drawings.

The structure of the multiplexer MUX according to some embodiments and components arranged around the multiplexer MUX will be described with reference to FIGS. 10 to 13. For the sake of convenience in explanation, descriptions of content that overlap the contents described above will be simplified or omitted.

Figure 10:
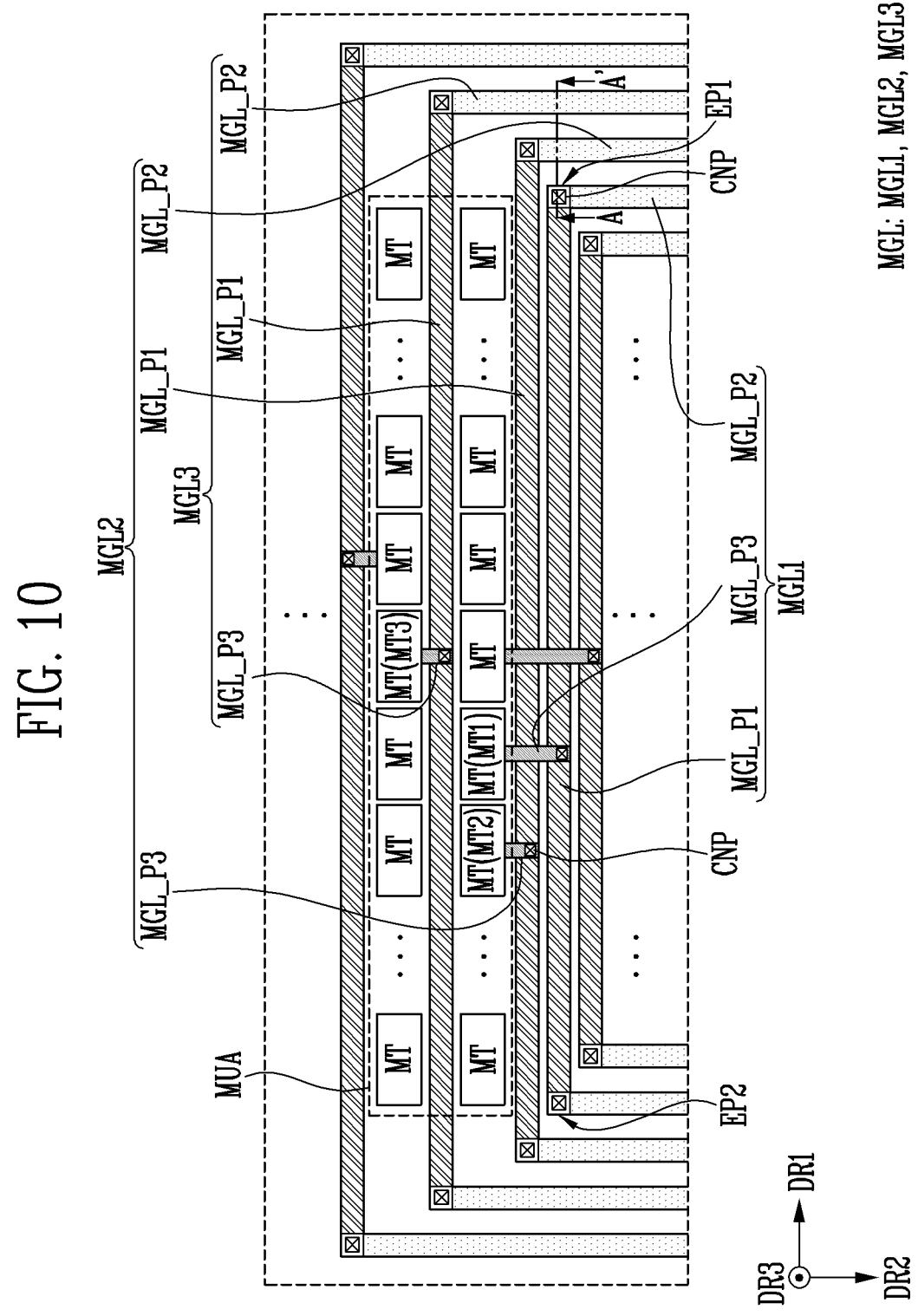
FIG. 10 is a schematic plan view illustrating a multiplexer and an area surrounding the multiplexer, according to some embodiments.
Figure 11:
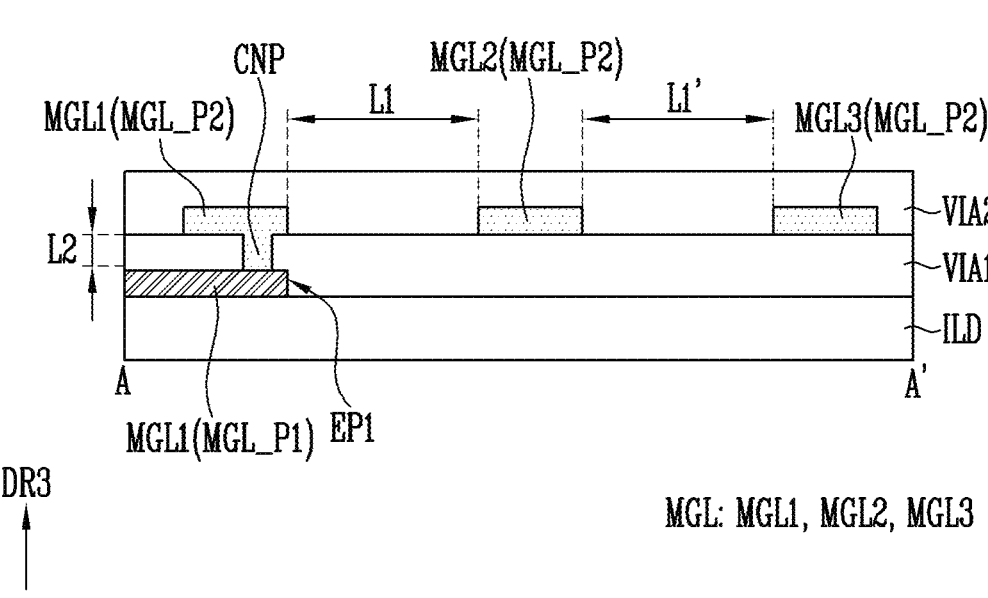
FIG. 11 is a schematic sectional view taken along line A-A' of FIG. 10.
Figure 12:
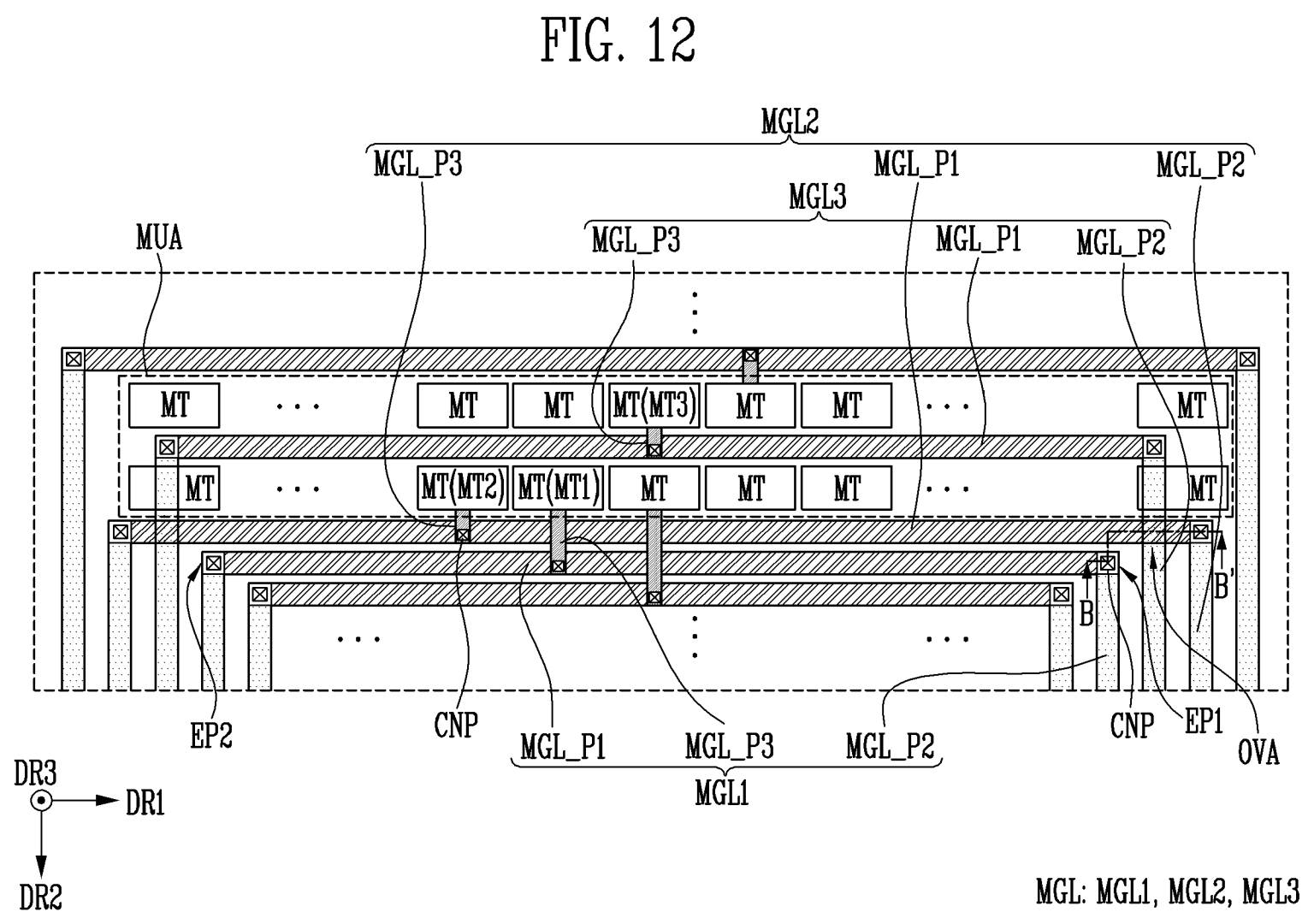
Figure 13:
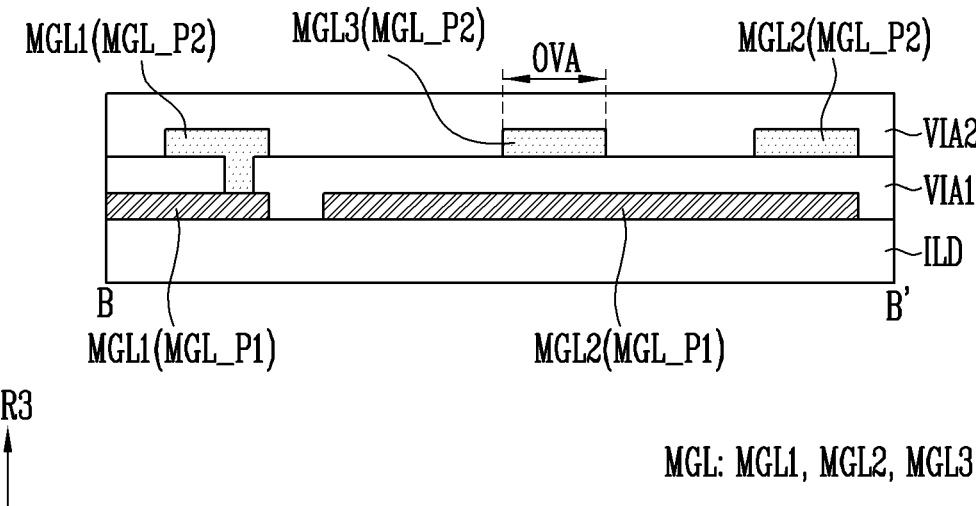
FIG. 13 is a schematic sectional view taken along line B-B' of FIG. 12.

FIG. 10 is a schematic plan view illustrating the multiplexer MUX and the area surrounding the multiplexer MUX, according to some embodiments. FIG. 11 is a schematic sectional view taken along line A-A' of FIG. 10. FIG. 12 is a schematic plan view illustrating the multiplexer MUX and the area surrounding the multiplexer MUX, according to some embodiments. FIG. 13 is a schematic sectional view taken along line B-B' of FIG. 12.

FIGS. 10 to 12 schematically illustrate a structure in which the respective MUX transistors MT are arranged. According to some embodiments, some of the MUX transistors MT illustrated in FIGS. 10 and 12 may form a single multiplexer circuit, and some of the MUX transistors MT may form another multiplexer circuit. For example, in FIGS. 10 and 12, each of the MUX transistors MT may form any one of the multiplexers MUX, and may be any one of the first to fourth MUX transistors MT1 to MT3. For the sake of convenience in explanation, only a third MUX gate line portion MGL_P3 for some of the MUX gate lines MGL is illustrated in FIGS. 10 and 12, but the embodiments are not limited thereto.

First, the display device DD according to some embodiments will be described with reference to FIGS. 10 and 11. Referring to FIGS. 10 and 11, the MUX gate line MGL may be located in a peripheral portion of the MUX transistors MT.

The MUX gate line MGL may be arranged around the MUX transistors MT, and may include MUX gate lines MGL sequentially arranged in a direction.

For example, some of the MUX gate lines MGL may be located on a lower side of the multiplexer area MUA. Some of the MUX gate lines MGL may be located between the MUX transistors MT in the multiplexer area MUA. Some of the MUX gate lines MGL may be located on an upper side of the multiplexer area MUA.

The MUX gate lines MGL may extend in two or more directions. For example, a portion of the MUX gate line MGL may extend in the first direction DR1, and another portion of the MUX gate line MGL may extend in the second direction DR2.

For example, the MUX gate line MGL may include a first MUX gate line portion MGL_P1 extending in the first direction DR1, and a second MUX gate line portion MGL_P2 extending in the second direction DR2. According to some embodiments, the MUX gate line MGL may include a third MUX gate line portion MGL_P3 that extends in the second direction DR2 and electrically connects the first MUX gate line portion MGL_P1 to the MUX transistor MT. The third MUX gate line portion MGL_P3 may be electrically connected to the first MUX gate line portion MGL_P1 through a contact member CNP.

According to some embodiments, a gate control signal GS provided from the sensor driver SDV may be applied to the gate electrode of the MUX transistor MT through the second MUX gate line portion MGL_P2, the first MUX gate line portion MGL_P1, and the third MUX gate line portion MGL_P3.

According to some embodiments, each MUX gate line MGL may include a plurality of second MUX gate line portions MGL_P2. One of the second MUX gate line portions MGL_P2 may be electrically connected to the first MUX gate line portion MGL_P1 on a first end EP1 of the first MUX gate line portion MGL_P1. Another of the second MUX gate line portions MGL_P2 may be electrically connected to the first MUX gate line portion MGL_P1 on a second end EP2 of the first MUX gate line portion MGL_P1.

According to some embodiments, the gate control signal GS may be applied to the first MUX gate line portion MGL_P1 through the first end EP1 or the second end EP2. In this case, the gate control signal GS may be transmitted to the gate electrode of the MUX transistor MT through the second MUX gate line portion MGL_P2, the first MUX gate line portion MGL_P1, and the third MUX gate line portion MGL_P3 that are adjacent to the first end EP1 or the second end EP2. In this case, a plurality of paths along which the gate control signal GS can be supplied from the sensor driver SDV may be formed, whereby the operation of turning on the MUX transistor MT can be efficiently controlled.

The MUX gate lines MGL may be sequentially arranged in a direction. For example, the respective first MUX gate line portions MGL_P1 of the MUX gate lines MGL may be arranged (e.g., sequentially arranged) in the second direction DR2. The respective second MUX gate line portions MGL_P2 of the MUX gate lines MGL may be arranged (e.g., sequentially arranged) in the first direction DR1. The respective third MUX gate line portions MGL_P3 of the MUX gate lines MGL may be arranged (e.g., sequentially arranged) in the first direction DR1.

According to some embodiments, the MUX gate lines MGL may be formed through the same process as at least some of the layers described above with reference to FIG. 5. The layers for forming the MUX gate lines MGL may be formed through the same process as at least some of the layers included in the circuit layer CIL in the display area DA, and may include the same material.

According to some embodiments, the first MUX gate line portion MGL_P1 may be patterned through the same process as the first interlayer conductive layer ICL1, and may include the same conductive material. For example, the first MUX gate line portion MGL_P1 may be patterned through the same process as the source/drain electrode of the transistor that forms the pixel circuit.

According to some embodiments, the second MUX gate line portion MGL_P2 may be patterned through the same process as the second interlayer conductive layer ICL2, and may include the same conductive material. For example, the second MUX gate line portion MGL_P2 may be patterned through the same process as a conductive portion in the circuit layer ICL that is electrically connected to the light emitting element (or the anode electrode) in the display area DA.

According to some embodiments, the third MUX gate line portion MGL_P3 may be patterned through the same process as the gate conductive layer GAT, and may include the same conductive material. For example, the third MUX gate line portion MGL_P3 may be patterned through the same process as the gate electrode of the transistor that forms the pixel circuit.

Here, the layers in which the first to third MUX gate lines portions MGL_P1, MGL_P2, and MGL_P3 are formed are not limited to the aforementioned example.

According to some embodiments, the MUX gate lines MGL, to which different gate control signals GS are respectively supplied, may not overlap each other in at least some areas when viewed in a plan view. An overlapping range between the MUX gate lines MGL to which different gate control signals GS are supplied may be relatively reduced (e.g., substantially reduced).

As a result, the overlapping range between the MUX gate lines MGL to which different gate control signals GS are supplied may be relatively reduced, thereby decreasing the risk of distortion in electrical signals, and reducing concerns about risks such as corrosion occurring in the MUX gate lines MGL in harsh environments (for example, high-temperature and/or high-humidity conditions).

According to some embodiments, the respective first MUX gate line portions MGL_P1 of the MUX gate lines MGL may not overlap each other in a plan view.

According to some embodiments, the respective second MUX gate line portions MGL_P2 of the MUX gate lines MGL may not overlap each other in a plan view.

According to some embodiments, the first MUX gate line portion MGL_P1 of one of the MUX gate lines MGL and the second MUX gate line portion MGL_P2 of another of the MUX gate lines MGL may not overlap each other in a plan view.

For example, the first MUX gate line portion MGL_P1 of the first MUX gate line MGL1 may not overlap the respective second MUX gate line portions MGL_P2 of the second and third MUX gate lines MGL2 and MGL3 in a plan view. The first MUX gate line portion MGL_P1 of the second MUX gate line MGL2 may not overlap the respective second MUX gate line portions MGL_P2 of the first and third MUX gate lines MGL1 and MGL3 in a plan view. The first MUX gate line portion MGL_P1 of the third MUX gate line MGL3 may not overlap the respective second MUX gate line portions MGL_P2 of the first and second MUX gate lines MGL1 and MGL2 in a plan view.

According to some embodiments, the second MUX gate line MGL2 may be closer to the multiplexer area MUA (or the MUX transistors MT) than the first MUX gate line MGL1. According to some embodiments, the first MUX gate line portion MGL_P1 of the second MUX gate line MGL2 may extend farther in the first direction DR1 than the first MUX gate line portion MGL_P1 of the first MUX gate line MGL1. The second MUX gate line portion MGL_P2 of the second MUX gate line MGL2 may extend in the second direction DR2 farther outside than the second MUX gate line portion MGL_P2 of the first MUX gate line MGL1. The second MUX gate line portion MGL_P2 of the second MUX gate line MGL2 and the second MUX gate line portion MGL_P2 of the first MUX gate line MGL1 may not overlap each other.

According to some embodiments, the third MUX gate line MGL3 may pass through the multiplexer area MUA unlike the second MUX gate line MGL2. According to some embodiments, the first MUX gate line portion MGL_P1 of the third MUX gate line MGL3 may extend farther in the first direction DR1 than the first MUX gate line portion MGL_P1 of the second MUX gate line MGL2. Therefore, the second MUX gate line portion MGL_P2 of the third MUX gate line MGL3 may extend in the second direction DR2 farther outside than the second MUX gate line portion MGL_P2 of the second MUX gate line MGL2. The second MUX gate line portion MGL_P2 of the third MUX gate line MGL3 and the second MUX gate line portion MGL_P2 of the second MUX gate line MGL2 may not overlap each other.

According to some embodiments, the MUX gate lines MGL may be sequentially arranged. Each of the MUX gate lines MGL may include a contact member CNP. According to some embodiments, the contact members CNP may be sequentially arranged in an oblique direction. The oblique direction may be parallel to a direction between the first direction DR1 and the second direction DR2.

According to some embodiments, the respective second MUX gate line portions MGL_P2 of the MUX gate lines MGL may be spaced apart from each other by first distances L1 and L1'. For example, the respective second MUX gate line portions MGL_P2 of the first and second MUX gate lines MGL1 and MGL2 may be spaced apart from each other by the first distance L1. The respective second MUX gate line portions MGL_P2 of the second and third MUX gate lines MGL2 and MGL3 may be spaced apart from each other by the first distance L1'.

According to some embodiments, the first interlayer conductive layer ICL1 and the second interlayer conductive layer ICL2 may be spaced apart from each other by a second distance L2 in the third direction DR3. For example, the first MUX gate line portion MGL_P1 and the second MUX gate line portion MGL_P2 may be spaced apart from each other by a second distance L2 in the third direction DR3. According to some embodiments, the first via layer VIA1 and the second via layer VIA2 may include organic material. Accordingly, portions that form the MUX gate lines MGL may be adjacent to each other with a structure including organic material.

According to some embodiments, each of the first distances L1 and L1' may be larger than the second distance L2. Accordingly, the MUX gate lines MGL to which gate control signals GS with different potentials are applied may be relatively spaced apart from each other in a planar direction. In other words, because the MUX gate lines MGL to which the gate control signals GS with different potentials are applied do not overlap each other and are be patterned to be spaced apart from each other by a relatively long distance, the risk that may arise due to excessive proximity of the gate control signals GS with different potentials can be relatively reduced.

Next, the display device DD according to some embodiments will be described with reference to FIGS. 12 and 13. For the sake of convenience in explanation, descriptions of content that overlap those of the embodiments described above will be simplified or omitted.

The display device DD according to some embodiments with reference to FIGS. 12 and 13 is different from the display device DD according to some embodiments as described above with reference to FIGS. 10 and 11 in that at least some of the MUX gate lines MGL overlap each other in a plan view.

Referring to FIGS. 12 and 13, according to some embodiments, the first MUX gate line portions MGL_P1 and the second MUX gate line portions MGL_P2 of some of the MUX gate lines MGL may overlap each other in a plan view.

According to some embodiments, some MUX gate lines MGL to which gate control signals GS with similar potentials are applied among the MUX gate lines MGL may overlap each other in a plan view.

For example, according to some embodiments, the second gate control signal GS2 applied to the second MUX gate line MGL2 and the third gate control signal GS3 applied to the third MUX gate line MGL3 may have similar potentials. For example, the second gate control signal GS2 and the third gate control signal GS3 may have a potential difference of 1 V or less. Alternatively, the second gate control signal GS2 and the third gate control signal GS3 may have voltages with the same potential (or substantially the same potential).

According to some embodiments, the first and second MUX gate line portion MGL_P1 and MGL_P2 of the first MUX gate line MGL1 may not overlap the first and second MUX gate line portions MGL_P1 and MGL_P2 of each of the second and third MUX gate lines MGL2 and MGL3 in a plan view.

According to some embodiments, the first MUX gate line portion MGL_P1 of the second MUX gate line MGL2 and the first MUX gate line portion MGL_P1 of the third MUX gate line MGL3 may not overlap each other in a plan view. The second MUX gate line portion MGL_P2 of the second MUX gate line MGL2 and the second MUX gate line portion MGL_P2 of the third MUX gate line MGL3 may not overlap each other in a plan view.

According to some embodiments, the second MUX gate line portion MGL_P2 of the third MUX gate line MGL3 may be located between the respective second MUX gate line portions MGL_P2 of the first and second MUX gate lines MGL1 and MGL2.

According to some embodiments, the first MUX gate line portion MGL_P1 of the second MUX gate line MGL2 and the second MUX gate line portion MGL_P2 of the third MUX gate line MGL3 may overlap each other in a plan view. For example, the first MUX gate line portion MGL_P1 of the second MUX gate line MGL2 and the second MUX gate line portion MGL_P2 of the third MUX gate line MGL3 may intersect with each other in an overlapping area OVA.

According to some embodiments, the MUX gate lines MGL may generally not overlap each other, but some MUX gate lines MGL to which gate control signals GS with similar potential differences are supplied may partially overlap each other. Accordingly, the risk of distortion of the gate control signals GS may be relatively reduced, and the risk of damage to the MUX gate lines MGL due to corrosion or the like may also be relatively reduced.

As a result, aspects of some embodiments of the present disclosure may include the display device DD that may be capable of relatively improving reliability of touch performance.

Figure 14:
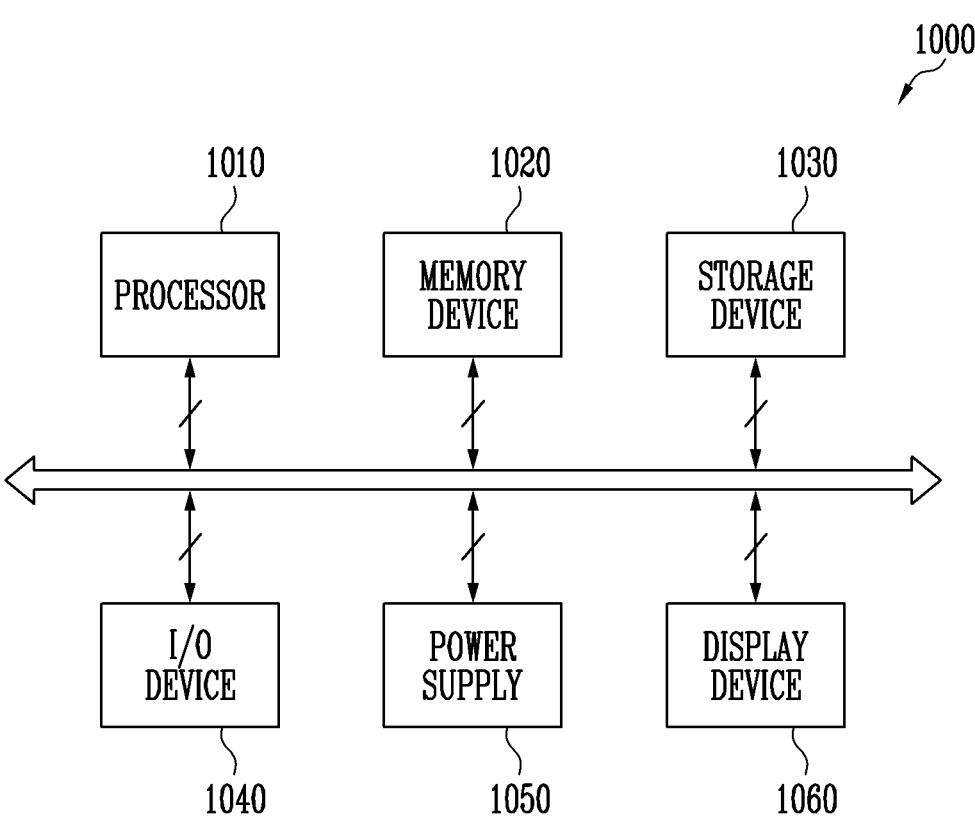
FIG. 14 is a schematic block diagram illustrating an electronic device including the display device according to some embodiments.
Figure 15:
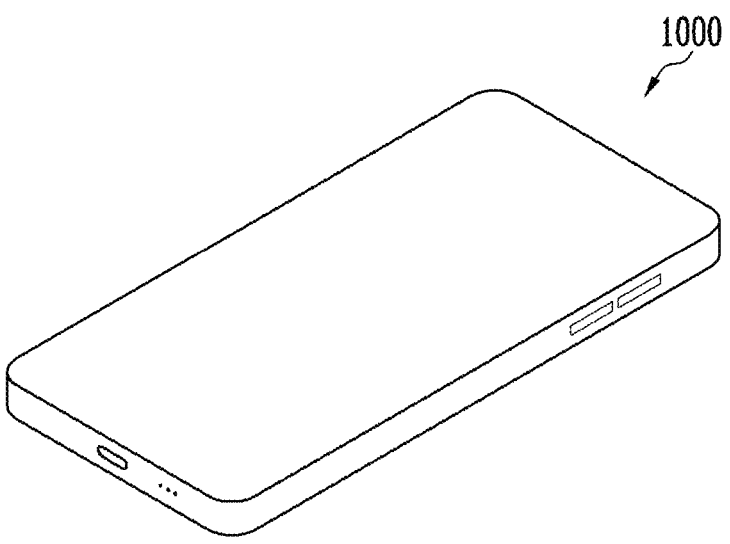
FIG. 15 is a schematic diagram illustrating an example where the electronic device of FIG. 14 is implemented as a smartphone.
Figure 16:
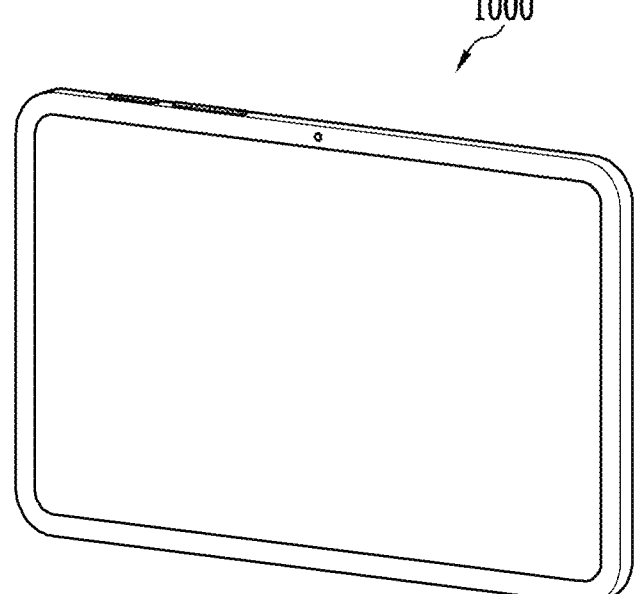
FIG. 16 is a schematic diagram illustrating an example where the electronic device of FIG. 14 is implemented as a tablet personal computer (PC).

FIG. 14 is a schematic block diagram illustrating an electronic device 1000 including the display device according to some embodiments. FIG. 15 is a schematic diagram illustrating an example where the electronic device 1000 of FIG. 14 is implemented as a smartphone. FIG. 16 is a schematic diagram illustrating an example where the electronic device 1000 of FIG. 14 is implemented as a tablet PC.

Referring to FIGS. 14 to 16, the electronic device 1000 may include a processor 1010, a memory device 1020, a storage device 1030, an input/output (I/O) device 1040, a power supply 1050, and a display device 1060. The display device 1060 may be the display device DD described above. The electronic device 1000 may further include various ports for communication with a video card, a sound card, a memory card, a USB device, or other systems. According to some embodiments, as illustrated in FIG. 15, the electronic device 1000 may be implemented as a smartphone. According to some embodiments, as illustrated in FIG. 16, the electronic device 1000 may be implemented as a tablet PC. However, the aforementioned examples are illustrative, and the electronic device 1000 is not limited to the aforementioned examples. For example, the electronic device 1000 may be implemented as a cellular phone, a video phone, a smartpad, a smartwatch, a navigation device for vehicles, a computer monitor, a laptop computer, a head-mounted display device, or the like.

The processor 1010 may perform specific calculations or tasks. According to some embodiments, the processor 1010 may be a micro processor, a central processing unit, an application processor, or the like. The processor 1010 may be connected to other components through an address bus, a control bus, a data bus, and the like. According to some embodiments, the processor 1010 may be connected to an expansion bus such as a peripheral component interconnect (PCI) bus. According to some embodiments, the processor 1010 may provide input image data to the display device 1060. Hence, the display device 1060 may display an image based on the input image data provided from the processor 1010.

The memory device 1020 may store data needed to perform the operation of the electronic device 1000. For example, the memory device 1020 may include non-volatile memory devices such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, and a ferroelectric random access memory (FRAM) device, and/or volatile memory devices such as a dynamic random access memory (DRAM) device, a static random access memory (SRAM) device, a mobile DRAM device, and so on.

The storage device 1030 may include a solid state drive (SSD), a hard disk drive (HDD), a CD-ROM, or the like.

The I/O device 1040 may include input devices such as a keyboard, a keypad, a touchpad, a touch screen, and a mouse, and output devices such as a speaker and a printer. According to some embodiments, the display device 1060 may be included in the I/O device 1040.

The power supply 1050 may supply power needed to perform the operation of the electronic device 1000. For example, the power supply 1050 may be a power management integrated circuit (PMIC). According to some embodiments, the power supply 1050 may supply power to the display device 1060.

The display device 1060 may display images corresponding to visual information of the electronic device 1000. The display device 1060 may be connected to other components through the buses or other communication links.

Aspects of some embodiments of the present disclosure may include a display device and an electronic device including the display device, capable of relatively reducing a risk of distortion of signals for sensing touch information.

Aspects of some embodiments of the present disclosure may include a display device and an electronic device including the display device, capable of relatively reducing a risk of damage to wirings.

Aspects of some embodiments of the present disclosure may include a display device and an electronic device including the display device, that may be capable of relatively improving the reliability of touch performance.

While aspects of some embodiments have been described above, those skilled in the art will appreciate that various modifications, additions and substitutions are possible, without departing from the scope and spirit of embodiments according to the present disclosure.

Therefore, the embodiments disclosed in this specification are only for illustrative purposes rather than limiting the technical spirit of embodiments according to the present disclosure. The scope of embodiments according to the present disclosure must be defined by the accompanying claims, and their equivalents.

What is claimed is:
1. A display device, comprising:
a display part including a base layer and a light emitting element on the base layer;
a sensing part on the display part, and including a sensing electrode;
a multiplexer electrically connected to the sensing electrode through a sensing line, and including multiplexer (MUX) transistors on a portion of the base layer; and
MUX gate lines electrically connected to the MUX transistors, wherein the MUX transistors comprise a first MUX transistor and a second MUX transistor, wherein the MUX gate lines comprise a first MUX gate line electrically connected to a first gate electrode of the first MUX transistor, and a second MUX gate line electrically connected to a second gate electrode of the second MUX transistor, wherein each of the MUX gate lines comprises a first MUX gate line portion extending in a first direction, and a second MUX gate line portion extending in a second direction different from the first direction, and the second MUX gate line portion is electrically connected to the first MUX gate line portion on an end of the first MUX gate line portion, and wherein the first MUX gate line portion of the first MUX gate line and the second MUX gate line portion of the second MUX gate line do not overlap each other in a plan view.

2. The display device of claim 1, wherein the first MUX gate line portion comprises first MUX gate line portions, and the first MUX gate line portions do not overlap each other in the plan view, and wherein the second MUX gate line portion comprises second MUX gate line portions, and the second MUX gate line portions do not overlap each other in the plan view.

3. The display device of claim 2, wherein the second MUX gate line is closer to the MUX transistors than the first MUX gate line, wherein the first MUX gate line portion of the second MUX gate line extends farther in the first direction than the first MUX gate line portion of the first MUX gate line, and wherein the second MUX gate line portion of the second MUX gate line extends in the second direction farther outside than the second MUX gate line portion of the first MUX gate line.

4. The display device of claim 1, wherein the second MUX gate line portion of the first MUX gate line and the second MUX gate line portion of the second MUX gate line are spaced apart from each other by a first distance, wherein the first MUX gate line portion and the second MUX gate line portion of the first MUX gate line are spaced apart from each other by a second distance in a thickness direction of the base layer, and wherein the first distance is larger than the second distance.

5. The display device of claim 1, wherein the MUX gate lines further comprise a third MUX gate line between the MUX transistors, and wherein the first MUX gate line portion and the second MUX gate line portion of the third MUX gate line do not overlap the first MUX gate line portion and the second MUX gate line portion of each of the first MUX gate line and the second MUX gate line in the plan view.

6. The display device of claim 1, wherein some of the MUX gate lines are on a lower side of a multiplexer area where the multiplexer is located, some of the MUX gate lines are between the MUX transistors in the multiplexer area, and some of the MUX gate lines are on an upper side of the multiplexer area.

7. The display device of claim 1, wherein the first MUX gate line portion and the second MUX gate line portion are electrically connected to each other through a contact member, wherein the contact member comprises contact members included in each of the MUX gate lines, and wherein the contact members are sequentially arranged in an oblique direction extending in a direction between the first direction and the second direction.

8. The display device of claim 1, wherein in each of the MUX gate lines, the second MUX gate line portion comprises second MUX gate line portions, wherein one of the second MUX gate line portions is electrically connected to the first MUX gate line portion on a first end of the first MUX gate line portion, and another of the second MUX gate line portions is electrically connected to the first MUX gate line portion on a second end of the first MUX gate line portion, wherein the first MUX gate line portion comprises first MUX gate line portions included in each of the MUX gate lines, and the first MUX gate line portions are arranged in the second direction, and wherein the second MUX gate line portion comprises second MUX gate line portions included in each of the MUX gate lines, and the second MUX gate line portions are arranged in the first direction.

9. The display device of claim 1, wherein the MUX gate lines further comprise a third MUX gate line between the MUX transistors, and wherein the first MUX gate line portion and the second MUX gate line portion of the third MUX gate line do not overlap the first MUX gate line portion and the second MUX gate line portion of the first MUX gate line in the plan view.

10. The display device of claim 9, wherein the second MUX gate line portion of the third MUX gate line overlaps the first MUX gate line portion of the second MUX gate line in the plan view.

11. The display device of claim 10, wherein the second MUX gate line portion of the third MUX gate line is between the second MUX gate line portion of the first MUX gate line and the second MUX gate line portion of the second MUX gate line.

12. The display device of claim 9, wherein gate control signals respectively supplied from the third MUX gate line and the second MUX gate line have a potential difference of 1 V or less.

13. The display device of claim 1, further comprising a sensor driver electrically connected to the multiplexer through signal lines, wherein the multiplexer is on one side of a sensing area where the sensing electrode is located, and wherein the multiplexer is configured to select some of signals supplied through the signal lines and to supply the selected signals to the sensing line.

14. The display device of claim 13, wherein the multiplexer comprises multiplexers each including a multiplexer circuit, and some of the multiplexers are arranged in the first direction, and some of the multiplexers are arranged in the second direction.

15. The display device of claim 13, wherein the signal lines comprise a first signal line configured to supply a first signal, a second signal line configured to supply a second signal, and a third signal line configured to supply a third signal, wherein the MUX transistors further comprise a third MUX transistor and a fourth MUX transistor, wherein the MUX gate lines further comprise a third MUX gate line and a fourth MUX gate line, wherein a first electrode of the first MUX transistor is electrically connected to the first signal line, and a second electrode of the first MUX transistor is electrically connected to a first node, wherein a first electrode of the second MUX transistor is electrically connected to the second signal line, and a second electrode of the second MUX transistor is electrically connected to the first node, wherein a first electrode of the third MUX transistor is electrically connected to the first node, a second electrode of the third MUX transistor is electrically connected to a second node, and a third gate electrode of the third MUX transistor is electrically connected to the third MUX gate line, wherein a first electrode of the fourth MUX transistor is electrically connected to the third signal line, a second electrode of the fourth MUX transistor is electrically connected to the second node, and a fourth gate electrode of the fourth MUX transistor is electrically connected to the fourth MUX gate line, and wherein the second node is electrically connected to the sensing line.

16. The display device of claim 15, wherein the multiplexer is configured to selectively supply any one of the first signal, the second signal, and the third signal to the sensing line, wherein the first MUX gate line is configured to supply a first gate control signal, wherein the second MUX gate line is configured to supply a second gate control signal, wherein the third MUX gate line is configured to supply a third gate control signal, wherein the fourth MUX gate line is configured to supply a fourth gate control signal, and wherein the first gate control signal, the second gate control signal, the third gate control signal, and the fourth gate control signal have different potentials.

17. The display device of claim 1, wherein the sensing electrode is configured to acquire information about a user touch input using a self-capacitance method.

18. The display device of claim 1, wherein the display part comprises a light-emitting-element layer including the light emitting element, and an encapsulation layer on the light-emitting-element layer, and wherein the sensing part is directly on the encapsulation layer.

19. The display device of claim 1, wherein the display part comprises a circuit layer including a pixel transistor electrically connected to the light emitting element, wherein the first MUX gate line portion includes material identical to material of a source/drain electrode of the pixel transistor, and wherein the second MUX gate line portion includes material identical to material of a conductive portion in the circuit layer electrically connected to the light emitting element.

20. An electronic device comprising:

a processor configured to provide input image data;

a display device configured to display an image based on the input image data; and a power supply configured to supply power to the display device, wherein the display device comprises:

a display part including a base layer and a light emitting element on the base layer;

a sensing part on the display part, and including a sensing electrode;

a multiplexer electrically connected to the sensing electrode through a sensing line, and including multiplexer (MUX) transistors on a portion of the base layer; and MUX gate lines electrically connected to the MUX transistors, wherein the MUX transistors comprise a first MUX transistor and a second MUX transistor, wherein the MUX gate lines comprise a first MUX gate line electrically connected to a first gate electrode of the first MUX transistor, and a second MUX gate line electrically connected to a second gate electrode of the second MUX transistor, wherein each of the MUX gate lines comprises a first MUX gate line portion extending in a first direction, and a second MUX gate line portion extending in a second direction different from the first direction, and the second MUX gate line portion is electrically connected to the first MUX gate line portion on an end of the first MUX gate line portion, and wherein the first MUX gate line portion of the first MUX gate line and the second MUX gate line portion of the second MUX gate line do not overlap each other in a plan view.

* * * * *